(12) United States Patent
Walrand et al.

(10) Patent No.: US 7,586,909 B1
(45) Date of Patent: Sep. 8, 2009

(54) STRIPING ALGORITHM FOR SWITCHING FABRIC

(75) Inventors: Jean Walrand, Berkeley, CA (US);
John T. Musacchio, Berkeley, CA (US);
Roy T. Myers, Santa Clara, CA (US);
Chung Kuang Chin, Saratoga, CA (US)

(73) Assignee: Agere Systems Inc., Allentown, PA (US)

( * ) Notice: Subject to any disclaimer, the term of this patent is extended or adjusted under 35 U.S.C. 154(b) by 1247 days.

(21) Appl. No.: 10/269,928

(22) Filed: Oct. 11, 2002

Related U.S. Application Data

(60) Provisional application No. 60/362,144, filed on Mar. 6, 2002.

(51) Int. Cl.
*H04Q 11/00* (2006.01)
(52) U.S. Cl. ............... 370/388; 370/231; 370/390
(58) Field of Classification Search ............... None
See application file for complete search history.

(56) References Cited

U.S. PATENT DOCUMENTS

| | | | | |
|---|---|---|---|---|
| 5,280,470 A | | 1/1994 | Buhrke et al. ............... 370/13 |
| 5,339,332 A | | 8/1994 | Kammerl .................... 375/10 |
| 5,367,518 A | * | 11/1994 | Newman .................... 370/414 |
| 5,455,826 A | | 10/1995 | Ozveren et al. .............. 370/60 |
| 5,475,682 A | | 12/1995 | Choudhury et al. .......... 370/60 |
| 5,754,120 A | * | 5/1998 | Argentati .................. 340/2.22 |
| 5,859,835 A | | 1/1999 | Varma et al. |
| 5,903,735 A | | 5/1999 | Kidder et al. ............ 395/200.7 |
| 5,923,644 A | | 7/1999 | McKeown et al. .......... 370/230 |
| 5,926,459 A | | 7/1999 | Lyles et al. ................ 370/230 |
| 5,930,234 A | | 7/1999 | Yoshida .................... 370/232 |
| 5,938,749 A | | 8/1999 | Rusu et al. .................. 710/54 |
| 5,946,297 A | | 8/1999 | Calvignac et al. .......... 370/230 |
| 6,038,217 A | | 3/2000 | Lyles ....................... 370/233 |

(Continued)

FOREIGN PATENT DOCUMENTS

WO    WO 00/64109 A1    10/2000

OTHER PUBLICATIONS

C. Clos, "A Study of Non-Blocking Switching Networks", Bell System Technical Journal, Mar. 1953, vol. 32, No. 3, pp. 406-424.

(Continued)

*Primary Examiner*—Duc C Ho
(74) *Attorney, Agent, or Firm*—Mendelsohn, Drucker & Associates, PC; Steve Mendelsohn

(57) ABSTRACT

A striping algorithm selects a route on which to transmit each next data segment, in dependence upon relative channel loading so far, taking account of multicast. Input modules can keep a channel loading history for each route it has, and can update its history for each route that a data segment follows through the fabric. In an embodiment, the input module transmits each data segment toward an i'th intermediate stage module, where i minimizes $$q(i,a(G),c)+q(i,b(G),c)+ \ldots +q(i,k(G),c),$$

where $q(i, j, c)$ indicates the number of bytes of data sent, during a given prior time period, from the input module to each j'th one of the output modules via each i'th one of the intermediate stage modules, and $a(G), b(G), \ldots,$ and $k(G)$ are the output module(s) in the multicast group G to which the data segment is destined.

106 Claims, 14 Drawing Sheets

U.S. PATENT DOCUMENTS

| | | | |
|---|---|---|---|
| 6,064,650 A | 5/2000 | Kappler et al. | 370/232 |
| 6,064,651 A | 5/2000 | Rogers et al. | 370/233 |
| 6,064,677 A | 5/2000 | Kappler et al. | 370/414 |
| 6,075,791 A | 6/2000 | Chiussi et al. | 370/412 |
| 6,078,585 A * | 6/2000 | Kakuma et al. | 370/388 |
| 6,101,193 A | 8/2000 | Ohba | 370/429 |
| 6,134,217 A | 10/2000 | Stiliadis et al. | 370/232 |
| 6,345,040 B1 | 2/2002 | Stephens et al. | 370/232 |
| 6,359,861 B1 | 3/2002 | Sui et al. | 370/230 |
| 6,388,992 B2 | 5/2002 | Aubert et al. | 370/232 |
| 6,426,944 B1 | 7/2002 | Moore | 370/236 |
| 6,625,160 B1 | 9/2003 | Suzuki | 370/413 |
| 6,683,884 B1 | 1/2004 | Howard | 370/412 |
| 6,721,273 B1 | 4/2004 | Lyon | 370/235 |
| 6,765,906 B1 | 7/2004 | Suzuki | 370/389 |
| 6,810,031 B1 | 10/2004 | Hegde et al. | 370/351 |
| 6,810,426 B2 | 10/2004 | Mysore et al. | 709/234 |
| 7,023,841 B2 | 4/2006 | Dell et al. | 370/388 |
| 7,023,857 B1 | 4/2006 | Chiussi et al. | 370/395.4 |
| 7,072,345 B2 * | 7/2006 | Siu et al. | 370/395.4 |
| 7,106,699 B2 | 9/2006 | Barri | 370/235 |
| 7,139,271 B1 | 11/2006 | Parruck et al. | 370/392 |
| 7,158,528 B2 | 1/2007 | Dell et al. | 370/416 |
| 2002/0012340 A1 | 1/2002 | Kalkunte et al. | 370/360 |
| 2002/0012341 A1 | 1/2002 | Battle et al. | 370/378 |
| 2002/0131413 A1 | 9/2002 | Tsao et al. | 370/392 |

OTHER PUBLICATIONS

M. Shreedhar and G. Varghese, "Efficient Fair Queuing Using Deficit Round Robin," in Proceedings of ACM SIGCOMM'95, pp. 231-242 (1995).

Adiseshu, Hari, et al., "Reliable FIFO Load Balancing over Multiple FIFO Channels," WUCS-95-11, May 3, 1995, pp. 1-24.

Juniper Networks, Inc., "Supporting Differentiated Service Classes: Queue Scheduling Disciplines," 2001, pp. 1-27.

"A Reliable and Sealable Striping Protocol*" by Hari Adiseshu et al. Department of Computer Science, Washington University, St. Louis, MO 63130, USA, 11 pages, Aug. 1996.

* cited by examiner

STRIPING ALGORITHM FOR SWITCHING FABRIC

CROSS-REFERENCES

This application claims the benefit of U.S. Provisional Application No. 60/362,144, filed Mar. 6, 2002, incorporated herein by reference in its entirety.

BACKGROUND

1. Field of the Invention

The invention relates to packet-based switching fabrics, and more particularly to a load balancing method and apparatus for selecting an appropriate next-stage module for transmission of a data packet in the presence of multicast capability.

2. Description of Related Art

A switch fabric for a data network is a device that allows data from any of several input ports to be communicated switchably to any of several output ports. Early data networks were based on circuit switching, in which fixed routes were established through the fabric for each session. The peak bandwidth demand of each session was allocated to the route for the entire duration of the session. When session traffic was bursty, however, circuit switching resulted in under-utilization of network resources during the time between bursts. Packet switching was developed to overcome this disadvantage, thus improving the network utilization for bursty traffic.

Packet switched networks dynamically allocate bandwidth according to demand. By segmenting the input flow of information into units called "packets," and processing each packet as a self-contained unit, packet switched networks allow scheduling of network resources on a per-packet basis. This enables multiple sessions to share the fabric resources dynamically by allowing their packets to be interleaved across the fabric. Typically each packet includes a header indicating its destination port, and the fabric includes a routing mechanism for determining a route through the fabric, on a per-packet basis. The present invention is concerned primarily with a routing mechanism for packet switched networks rather than circuit switched networks.

Small switching fabrics can be constructed from crossbar switches, in which input ports are connected to the rows of a grid and the output ports are connected to the columns of the grid (or vice-versa). Each input port then can be connected to any output port merely by activating the switch at the grid junction at which they intersect. Multicast data flow can be supported just as easily, by turning on more than one junction switch to connect more than one output port to a single input port.

Crossbar switches do not scale well to larger fabrics. Many larger fabrics therefore use a multi-stage network topology, in which switching from a number of input ports to a number of output ports is accomplished through one or more intermediate stages. Each stage can have one or more module, each implementing its own internal switch. In addition, in a fully connected network, all of the modules in each stage of the network have respective communication paths to all of the modules in the next stage. A basic network of this sort has three stages (input, intermediate and output), but networks with any odd number of stages theoretically can be constructed by replacing the modules in any given stage with smaller multi-stage networks in recursive fashion.

A special case of multi-stage switch networks was studied by Clos in C. Clos, "A Study of Non-Blocking Switching Networks", Bell System Technical Journal, March 1953, vol. 32, No. 3, pp. 406-424, incorporated by reference herein. A so-called Clos network has three stages, any of which can be recursed to create effectively a network with a larger odd number of stages. All input stage modules (sometimes simply called "input modules") of the network have an equal number of input ports, all output stage modules (sometimes simply called "output modules") have an equal number of output ports, and all input and output modules are fully interconnected with all intermediate stage modules (sometimes simply called "intermediate modules"). Clos networks can be symmetric, in which case the number of modules and the number of ports per module on the input side match the corresponding values on the output side, or they can be asymmetric, in which case the number of modules or the number of ports per module on the input side do not necessarily match the corresponding values for the output side. A symmetric Clos network, therefore, can be characterized by a triple (m, n, r) where m is the number of modules in the intermediate stage, n is the number of input ports on each input module (the same as the number of output ports on each output module), and r is the number of modules in the input stage (the same as the number of modules in the output stage). An asymmetric Clos network must be characterized by a quintuple (m, $n_1$, $r_1$, $n_O$, $r_O$). The invention is most useful in Clos networks, but under proper circumstances it can also be used in multi-stage networks that do not strictly meet the definition of a Clos network.

Multi-stage networks scale better than pure crossbar switch networks, to a point, but also introduce the possibility of blocking operation. That is, because data from more than one input port have to share the same intermediate modules, a possibility exists that when data is ready for transmission, all possible routes to the output module having the desired destination output port might be blocked by other data flows. Theoretical formulas exist for calculating the minimum required number of intermediate stage modules and stage-to-stage data link rates in order to provide non-blocking operation given specified maximum input and output port numbers and data rates, but these minimum requirements are only necessary conditions; they are not necessarily sufficient by themselves to achieve non-blocking operation. Networks also must be designed to choose appropriate routes through the intermediate stage modules for individual data, packets, and to backpressure them properly.

For example, consider a 3-stage Clos network having two input modules, two output modules, two input ports on each input module, and two output ports on each output module. Assume further that the maximum data rate per input port, the maximum data rate per output port, and the stage-to-stage link data rate, are all R. Then a necessary condition to non-blocking operation is that there be at least two intermediate stage modules. This can be seen because the total output capacity of a given one of the input modules would be 2R (R to each of the two intermediate stage modules), which is no less than the maximum total input data rate of the input module, which in this case is also 2R (R from each of the two input ports to the module). The same is true for every other module in the network. However, assume now the extreme case that the routing algorithm employed by a given one of the input modules is to always send all input packets to the first intermediate stage module and never to the second. In this case, since the data rate from an input module to a single intermediate stage module is only R, the fabric will be able to transport only half the combined data rate that was promised to the two input ports of that module, and the fabric will have to block packets from one or the other or both of such input ports whenever their combined input data rate exceeds R.

The algorithm used by an input module to decide which intermediate module to send the next packet to is known variously as a load balancing, channel balancing, or striping algorithm. Much research has been conducted into optimum load balancing algorithms. Many of the algorithms apply only to the older circuit switched networks, but many others apply to packet switched networks. The algorithms applicable to packet switched networks are the ones of interest in the present discussion.

It will be appreciated that striping algorithms are different from "fair queuing" algorithms, or queue scheduling algorithms, the purpose of which are to select which of a plurality of non-empty input queues the next packet is to be taken from for transmission across the fabric. Typically an input module requires both kinds of algorithms: a fair queuing algorithm to determine which input queue to service next, and then a striping algorithm to determine how to route the next packet from the input queue chosen by the fair queuing algorithm. A duality does exist between the two kinds of algorithms, but only in certain circumstances can a fair queuing algorithm be converted directly to a load balancing algorithm or vice versa. For example, whereas it might be desired to formulate a striping algorithm that will achieve certain goals under a particular set of striping conditions, there may be no useful dual of such a striping algorithm in the fair queuing arena because there is no useful dual of the goals or set of conditions in the fair queuing arena. In such a situation, it might not be intuitive that direct conversion of any known fair queuing algorithms will be optimal as a load balancing algorithm under the set of conditions for which a striping algorithm is being developed.

A good striping algorithm should be able to minimize the probability of blocking operation while utilizing all of the available channels in proportion to their respective capacities. One way to achieve these goals might be through the use of a global supervisor that is continually aware of queue lengths in all channels, and uses this information to choose the best route for the next packet. This solution does not scale well, however, for a number of reasons. First, as the number of input and output ports grow, and channel data rates increase, it becomes increasingly difficult to design logic circuitry that is fast enough to make all the required calculations in time for each packet. Second it also becomes increasingly difficult to design in sufficient control signal capacity to transmit the information from all the various queues in the network back to the supervisor. The latter problem is only exacerbated when the various ports, queues and routes are spread out over multiple chips, boards or systems.

Because of these problems, a number of different striping algorithms have been developed for three-stage networks which do not require direct knowledge of downstream queue lengths. These algorithms therefore avoid (or at least reduce the amount of) control signaling required across the network. Because these algorithms rely on probabilities rather than determiinistic calculations, they achieve the goals of non-blocking operation and fair channel usage with varying degrees of success in different circumstances.

In one such algorithm, known as round robin (RR) striping, packets are sent from the input stage to the intermediate stage modules in a round-robin order. This algorithm is generally simple to implement, but it does not take account of different bandwidth capacities available on different channels. For switching fabrics having different capacities on different channels, a weighted round robin (WRR) striping algorithm is known, in which during each round robin cycle, the number of packets transmitted on each channel is proportional to the capacity of that channel. Both round robin and weighted round robin striping algorithms achieve the goals of non-blocking operation and fair channel usage best when the algorithm can be implemented globally across all input queues. In many kinds of fabrics, however, the input queues are distributed across multiple input modules. Coordination among the input queues becomes more, and more difficult as the number of input modules increases, thereby stifling the scalability of the network. In this case it is known to allow each input module to implement its own round robin or weighted round robin striping, without coordinating with the other input modules. This leaves open a small risk that two or more modules will synchronize, but that risk is accepted or otherwise avoided in various implementations.

Round robin and weighted round robin striping algorithms, however, do not optimize load balancing when the packet size is variable. As an example, consider a Clos network having two modules in the intermediate stage, equal data rates on all channels, and a sequence of packets to send which alternate in size between large and small. In this case an input module implementing a round-robin striping algorithm will alternate striping between the two intermediate stage modules and will do so synchronously with the packet size. All the large size packets will therefore be sent through one of the intermediate stage modules (call it intermediate stage module #1) while all the small size packets will be sent through the other intermediate stage module (call it intermediate stage module #2). The algorithm therefore does not maximally utilize all of the available channels in proportion to their respective capacities. Nor does it ensure non-blocking operation, because the fabric might have to hold up a large size packet while it waits for the output queue of intermediate stage module #1 to empty. If the small size packet behind the large size packet has already arrived into the input module, its transmission will be blocked even if the route through intermediate stage module #2 is clear. Still further, if the traffic is not well balanced across the links, then some links may be oversubscribed, i.e., presented with traffic whose rate exceeds that of the link. In the event that this imbalance persists for long enough, the node that oversubscribes the link can accumulate excess traffic until it overflows and is forced to drop packets.

In order to address issues of variable packet size, a striping algorithm known as deficit round robin (DRR) has been developed. According to the DRR algorithm, a deficit count is maintained for each channel. Before packets are sent on a current channel, a quantum is added to the deficit count for that channel. If channel capacities differ, then the quantum for each channel can be proportional to the relative capacity of that channel (Deficit Weighted Round Robin—DWRR). Then, if the length of the packet is smaller than the deficit count for the current channel, then the packet is sent on that channel and the deficit counter for that channel is reduced by the length of the packet. The sender continues sending packets on the current channel, concomitantly reducing the deficit count for that channel, until the length of the next packet to send is greater than the deficit count for the current channel. The sender then moves on to the next channel in round robin sequence, adds the quantum to the deficit count for the new channel, and tests the count against the length of the new packet. As with RR and WRR, DRR and DWRR algorithms can be implemented in a distributed manner to thereby improve scalability.

DRR and DWRR can be very good at avoiding blocking situations and using all channels in proportion to their respective capacities, but it is not believed that these algorithms have been considered for use in a switching fabric. An example of DRR striping is described for example in H. Adiseshu, G. Parulkar, and G. Varghese, "A Reliable and Scalable Striping Protocol," in Proceedings of ACM SIGCOMM '96, pp. 131-141 (1996), incorporated by reference herein, but only for the problem of selecting among multiple parallel routes from a single source node to a single destination node. It is not clear from this paper how to adapt the algorithm for use in a multi-stage switching fabric, which usually includes multiple input nodes, multiple destination nodes, and multiple routes from each input node to each destination node, some of which share common data paths for part of the route (e.g. the part of the route from the input module to the intermediate stage modules.)

The DRR and DWRR load balancing algorithms also do not address the problems created by a multicast replication capability in downstream modules. In many situations it is desirable for one node of a network to communicate with some subset (proper or improper) of all the nodes in the network. For example, multi-party audio and video conferencing capabilities and audio and video broadcasting to limited numbers of nodes are of considerable interest to users of packet-switched networks. To satisfy such demands, packets destined for several recipients typically are transmitted from a source to a point in a network at which the packets are replicated and forwarded on to all recipients in the multicast group. Multicast routers have been developed which perform the replication service. Since demand for these kinds of services is increasing, it would be desirable to design a new switch fabric architecture for use in many different kinds of equipment including multicast routers and other multicasting elements. Thus it would be extremely desirable if the switch fabric architecture would include multicast replication capability.

Multicast replication is advantageously performed as close as possible to the output ports of the fabric. If the replication were to be performed in the input modules, then each replica could be considered as a separate packet and striped effectively using DRR or DWRR. But then multiple identical packets would be traversing the fabric unnecessarily and a significant fraction of the fabric's overall capacity could be impacted. Thus if two or more members of the multicast group are reached through output ports on a single output module, then replication of the packets for those members of the group is advantageously delayed until the packets reach that output module. If two members of the multicast group are reached through different output modules, then replication of the packets for those members must be performed in the intermediate stage modules. In a fully connected multi-stage switching fabric, it is rarely necessary to replicate packets in the input modules.

Because multicast replication is rarely performed at the input ports of a fabric, multicast capability in a switch fabric can be problematical for a striping algorithm. When a packet flow is replicated in an intermediate stage module and then sent to two or more different output modules, the bandwidth utilization of the paths from the intermediate stage to the output stage differs from that of a fabric that does not perform multicast replication. In addition, whereas in a unicast fabric only one intermediate stage output queue is affected by each packet sent from an input module, in a multicast fabric, many intermediate stage output queues can be affected. Neither of these considerations are taken into account in the DRR and DWRR load balancing algorithms. Without modification, therefore, a fabric that is capable of multicast replication will not achieve the goals of minimum risk of blocking operation and fair utilization of channel capacity if it attempts to use a known DRR or DWRR striping algorithm.

One might consider developing a global supervisor that directly observes the queue lengths and the packets in-flight to each output module, and selects the best route for each next packet in dependence upon this information. Such a supervisor could successfully achieve full throughput and full usage of channel capacity, but as previously mentioned, a global supervisor does not scale well. Thus whereas a striper implemented in a global supervisor might be adequate for small fabrics, it would not be adequate for larger fabrics. A switching fabric architecture that relied on such a striper therefore would be limited in application only to small systems.

Accordingly, there is an urgent need for a switch fabric architecture that can achieve full throughput and maximum channel usage, and that is applicable to a wide variety of network elements, including satisfaction of the increasing need for fabrics supporting multicast replication. As an important part of achieving these goals, there is an urgent need for a new striping algorithm that continues to minimize the blocking risk and maximize fair channel utilization, whether or not the fabric's multicast capability is exercised. Preferably such a striping algorithm can be implemented in a distributed manner, so as to find applicability in both small and large fabrics.

SUMMARY OF THE INVENTION

According to the invention, roughly described, a striping algorithm selects a route on which to transmit each next data segment, in dependence upon the relative channel loading so far, to the extent known by the subject input module, but taking account of multicast. To accomplish this, in an embodiment, the input module can keep a channel loading history for each route that it has to the output stage, and can update its history in conjunction with the sending of data segments out into the fabric. For multicast data packets, each destination output module can be considered to define a separate route, and the input module can update its channel loading history for each route that the data segment follows through the fabric.

In an embodiment, the input module transmits each next data segment toward an i'th one of the intermediate stage modules, where i minimizes $$q(i,a(G),c)+q(i,b(G),c)+\ldots+q(i,k(G),c),$$

where $q(i, j, c)$ indicates the number of bytes of data sent, during a given prior time period, from the input module to each j'th one of the output modules via each i'th one of the intermediate stage modules, G is a multicast group of at least one output module to which the data segment is destined, $a(G), b(G), \ldots,$ and $k(G)$ are the output module(s) in multicast group G, and c is the class of the data segment. The input module can maintain its channel loading histories by, in conjunction with the sending of a particular data segment to the output ports in a multicast group G of at least one output module, via an i'th one of the intermediate stage modules, increasing the number of bytes of data indicated by each of $q(i, a(G), c), q(i, b(G), c), \ldots,$ and $q(i, k(G), c)$, relative to all other $q(i, j, c)$, by the number of bytes in the particular data segment.

In an embodiment in which the data handling capacity on the various routes to the output modules can differ, the counts in the $q(i, j, c)$ can be normalized according to the capacity of each route. This can be accomplished by first letting $L(i,j)$ be the data rate from the input module, via module i, to output module j. This data rate is the data rate from the input module to module i or the data rate from module i to module j, whichever is less. Then let $L_{max}$ be the maximum of all the $L(i,j)$. Then in conjunction with the sending of each particular data segment to the output ports in multicast group G via the i'th intermediate stage module, the value in q(i,a(G),c) is increased by $L_{max}$/L(i,a(G),c) times the number of bytes in the particular data segment; the value in q(i,b(G),c) is increased by $L_{max}$/L(i,b(G),c) times the number of bytes in the particular data segment; and so on, all relative to all other q(i, j, c). Alternatively, if the queue counts are all increased only by the number of bytes sent, then the normalization factor can be applied in the minimum sum test by selecting the intermediate module i as the i that minimizes q(i,a(G),c)/L(i,a(G),c)+q(i,b(G),c)/L(i,b(G),c)+ . . . + q(i,k(G),c)/L(i,k(G),c).

In an embodiment, all data segments are treated as being of a single class (even if they belong to more than one class of service), in which case the "c" terms in the above formulas can be omitted as superfluous.

BRIEF DESCRIPTION OF THE DRAWINGS

The invention will be described with respect to specific embodiments thereof, and reference will be made to the drawings, in which.

DETAILED DESCRIPTION

Figure 1:
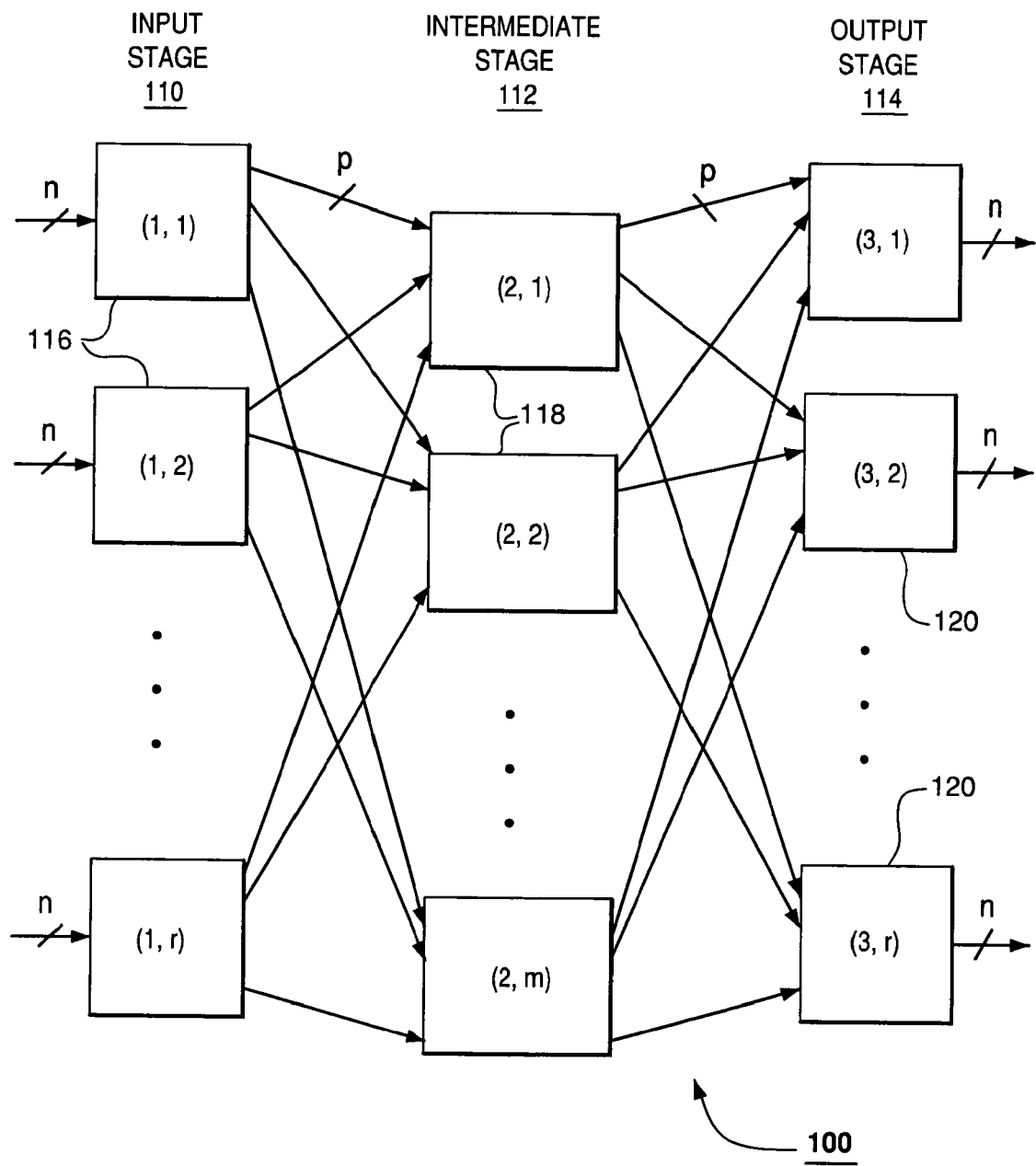
FIGS. 1, 1A, 1B, 1C, 1D, 2, 3 and 7 are block diagrams of modular switch fabrics incorporating features of the invention.

FIG. 1 is a block diagram of a modular switch fabric 100 incorporating the invention. The fabric of FIG. 1 has three stages: an input stage 110, an intermediate stage 112 and an output stage 114. The stages are also sometimes referred to herein as the first, second and third stage, respectively. Any or all of the modules can implement its switching function internally by using a crossbar switch, one or more recursive levels of 3-stage sub-networks, or by any other structure. The input stage 10 of the fabric has r input modules 116, numbered (1,1) through (1,r). Each input module 116 has n input ports and mp output ports. The intermediate stage 112 has m modules 118, numbered (2,1) through (2, m). The number of data links from each input module 116 to each intermediate stage module 118 is p. Alternatively, a different embodiment can implement only one data link from each input module 116 to each intermediate stage module 118, but with a capacity of p times the capacity of each fabric input port. Each intermediate stage module 118 includes rp input ports and rp output ports. The output stage 114 of the fabric has r output modules 120, numbered (3,1) through (3, r). Each output module 120 has mp input ports and n output ports. Not shown in FIG. 1 are input line cards, which are upstream of the input stage 110, and output line cards, which are downstream of output stage 114. Also not shown are serializer/deserializer integrated circuits used for transporting signals across a switch backplane.

The fabric of FIG. 1 is an (m, n, r) symmetrical Clos network, but the general principles of the invention will also work with asymmetrical Clos networks, networks which are not fully interconnected, networks in which not all of the input modules have an equal number of input ports and/or not all output modules have an equal number of output ports, and so on. Clos networks are preferred, however, because their throughput properties are easier to analyze and prove theoretically. Clos networks are preferred also because they are easier to build in a modular fashion. In particular, all of the modules 116 in the input stage 110 of the fabric of FIG. 1 are identical; all of the modules 118 in the intermediate stage 112 of the fabric of FIG. 1 are identical; and all of the modules 120 in the output stage 114 of the fabric of FIG. 1 are identical. Preferably, in fact, all of the modules in all of the stages of the fabric of FIG. 1 are fabricated from identical integrated circuit chips, sometimes referred to herein as Cashmere chips, which are designed to include all of the features required for any stage of the fabric. The chip is configured as an input module 116, an intermediate stage module 118 or an output module 120, by pin strapping or programming, depending on the stage at which the particular chip is deployed in the fabric.

Because of the modular nature of the architecture, non-blocking fabrics with 8 to 128 input and output ports and various topologies can be built with Cashmere integrated circuit chips. Using a companion Pashmina integrated circuit chip, five such fabrics can be connected in parallel to build fabrics with 16 to 128 quad-speed input and output ports and 1:4 redundancy. Blocking architectures with a larger throughput can also be designed.

Figure 1A:
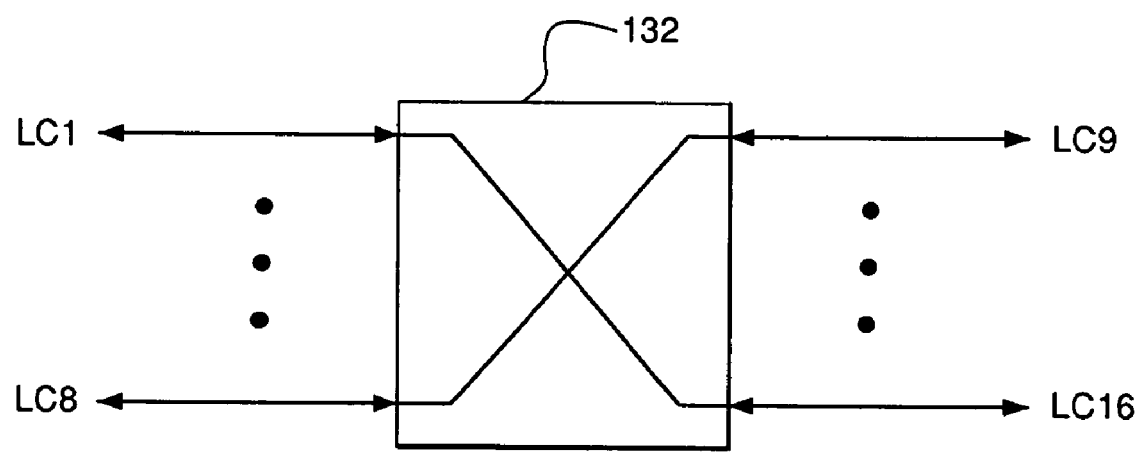

FIG. 1A, for example, shows a fabric that contains only one module 132. The module has 16 bidirectional ports, each of which is connected to a respective line card LC1-LC16 (not shown). The fabric of FIG. 1A does not require the use of the striping algorithm, at least not externally to the module 132. This fabric is sometimes referred to herein as a C fabric, reflecting the fact that traffic passes through only one cashmere integrated circuit chip. If each I/O port of the fabric supports a net data rate of 10 Gbps in each direction, then the overall fabric a FIG. 1A has a net data throughput of 160 Gbps.

Figure 1B:
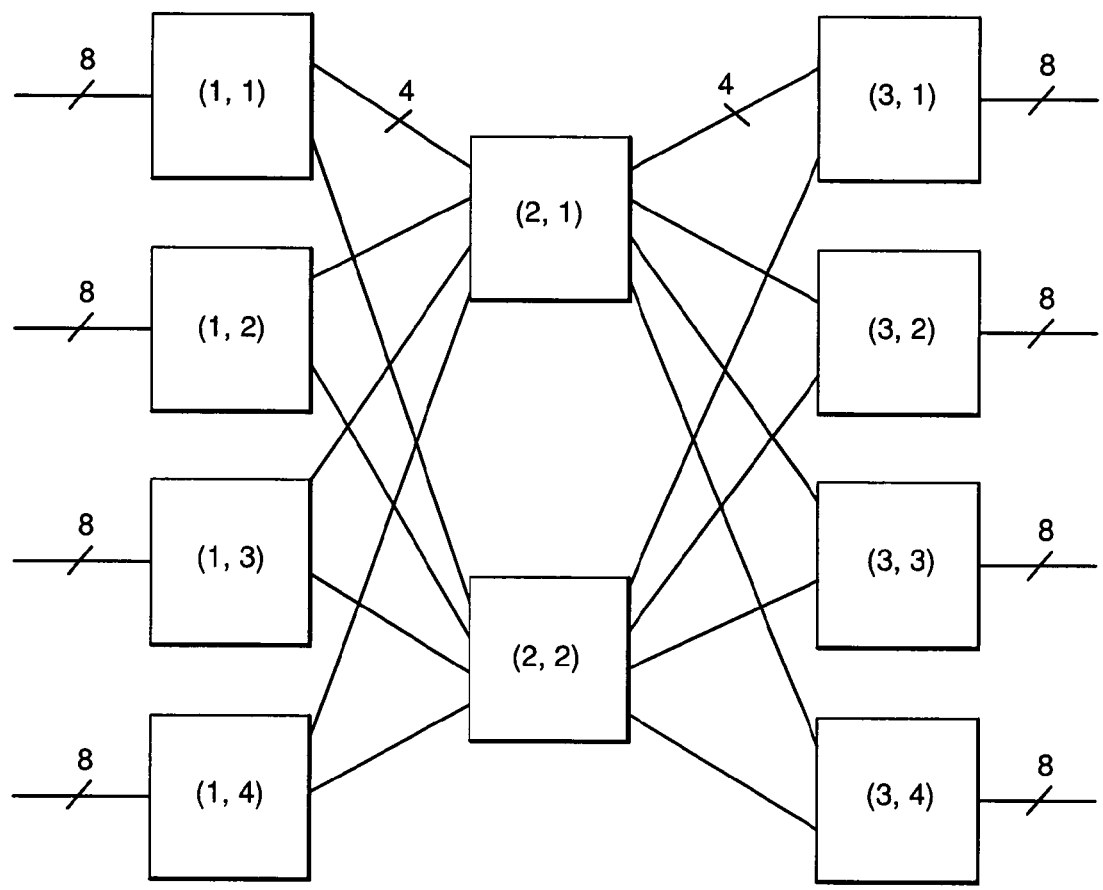

FIG. 1B illustrates a three-stage fabric made using 10 modules organized as four input modules (r=4), two intermediate stage modules (m=2) and four output modules. Each input module has eight input ports; and each output module has eight output ports (n=8). Each input module has four parallel data links to each intermediate stage module, and each intermediate stage module has four parallel data links to each output module. Traffic flow is from left to right in this and all fabric topology drawings herein, unless arrows on the data paths indicate otherwise. This topology supports up to 32 input line cards and 32 output line cards, or in a folded equivalent topology (discussed below with respect to FIG. 2), it supports 32 bidirectional line cards. If each port of the fabric supports the net data rate of 10 Gbps, then the overall fabric of FIG. 1B has a net data throughput of 320 Gbps This fabric utilizes the striping algorithms described herein.

Figure 1C:
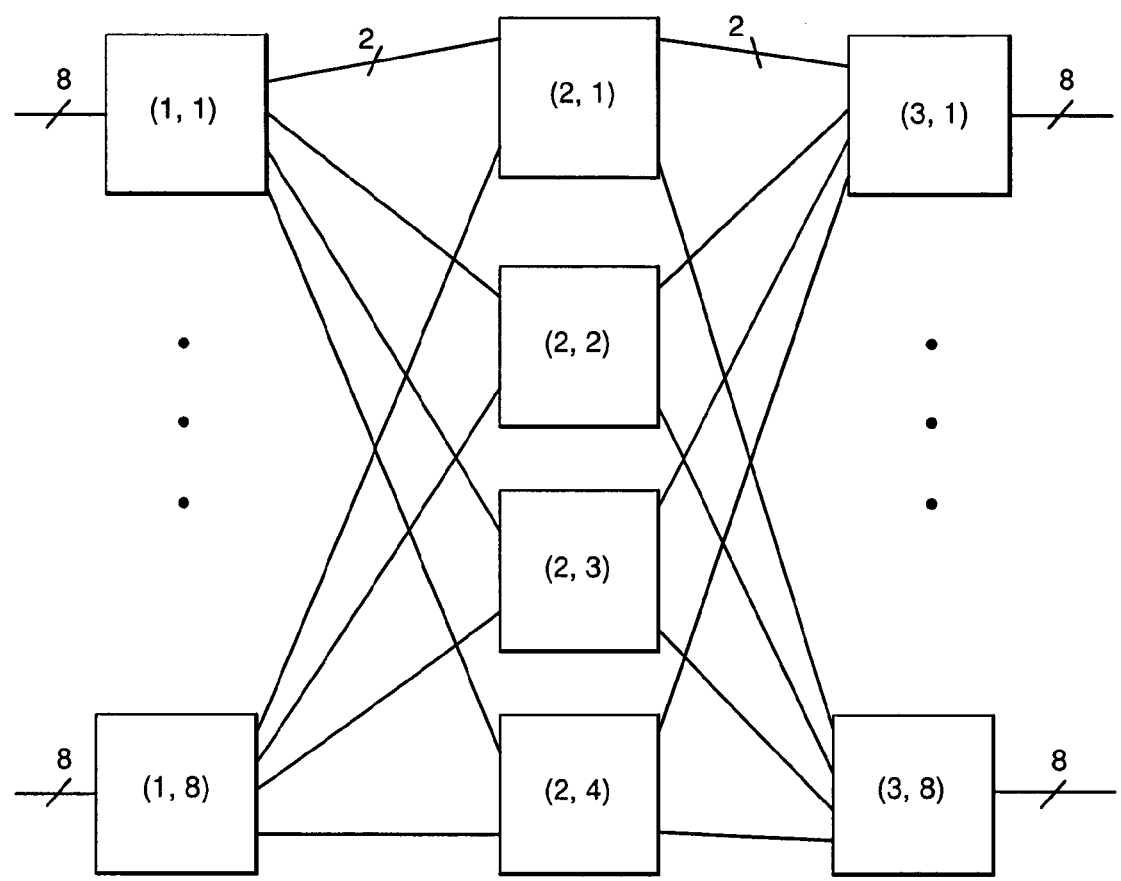
Figure 1D:
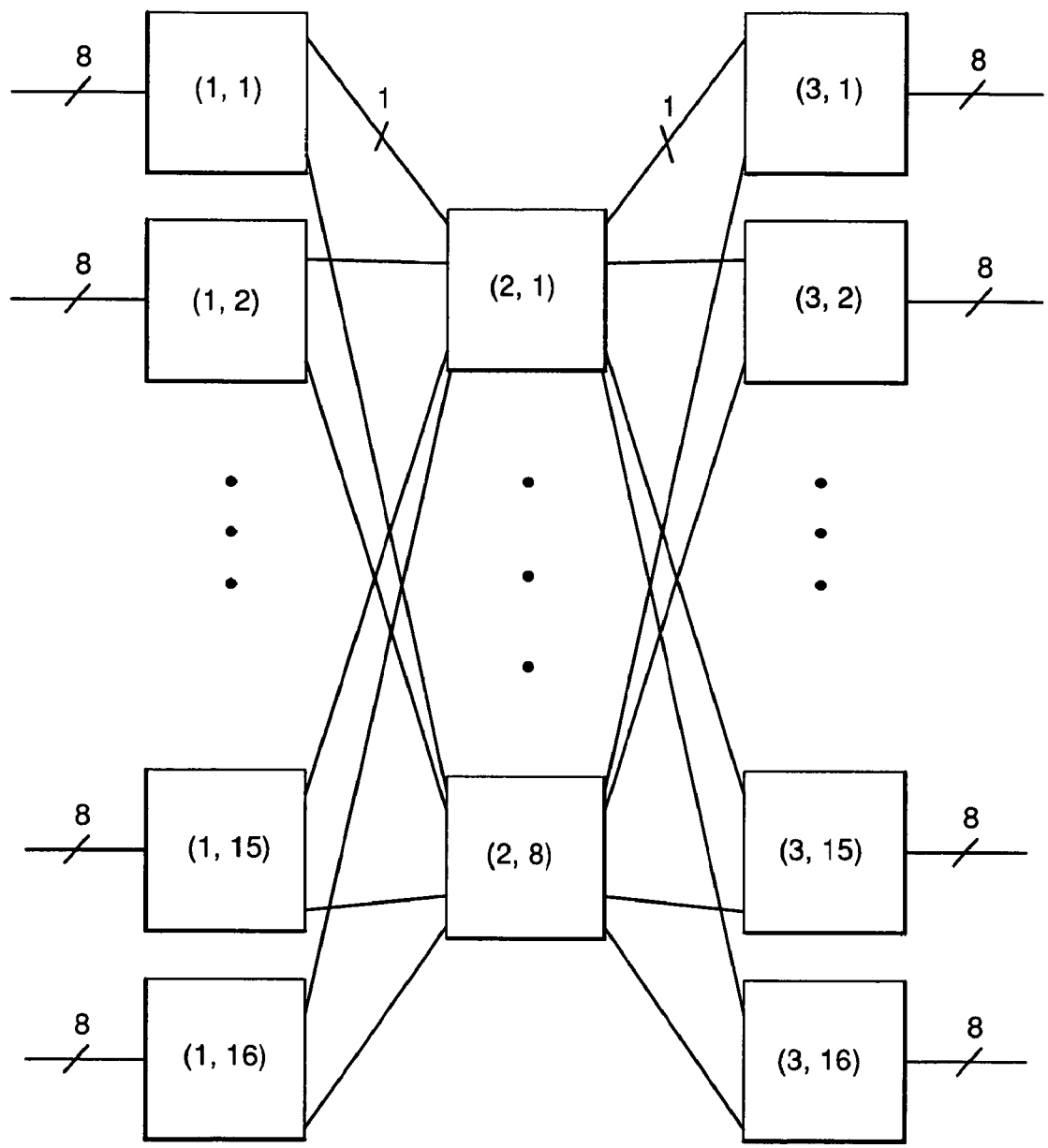

FIG. 1C illustrates yet another topology which can be formed using cashmere modules. This topology includes eight input modules (r=8), eight output modules, and four intermediate modules (m=4). Each input module has eight input ports, and each output module has eight output ports (n=8). Each intermediate module has two data links to each of the input modules and to each of the output modules (p=2). This topology supports up, to 64 input line cards and 64 output line cards, or in a folded equivalent topology, it supports 64 bidirectional line cards. If each port of the fabric supports the net data rate of 10 Gbps, then the overall fabric of FIG. 1C has a net data throughput of 640 Gbps FIG. 1D illustrates still another topology which can be formed using cashmere modules. This topology includes a 16 input modules, 16 output modules (r=16), and eight intermediate stage modules (m=8). Each input module has eight input ports, and each output module has eight output ports (n=8). Each intermediate module has only one data link to each of the input modules and to each of the output modules (p=1). This topology supports up to 128 input line cards and 128 output line cards, or in a folded equivalent topology, it supports 128 bidirectional line cards. If each port of the fabric supports the net data rate of 10 Gbps, then the overall fabric of FIG. 1D has a net data throughput of 1.28 Tbps. It can be seen that in all of the example topologies of FIGS. 1B-1D, r=2m.

All of these various technologies are made possible in part by the distributed nature of the striping algorithm described herein. Thus a manufacturer of input, intermediate and output modules according to the invention can provide input, output and intermediate stage modules for each of first and second fully interconnected multicast data switches, preferably non-blocking, wherein all of the input modules provided for both the first and second data switches are identical in the logic they contain, and wherein the number of input modules provided for the second data switch differs from the number of input modules provided for the first data switch. Furthermore, all of the intermediate stage modules provided for both the first and second data switches can be identical in the logic they contain, with the number of intermediate stage modules provided for the second data switch differing from the number of intermediate stage modules provided for the first data switch. In fact, all of modules provided for both the first and second data switches can be identical in the logic they contain.

In an embodiment, the number of input modules provided for the second data switch can be twice as large as the number of input modules provided for the first data switch. In an embodiment, the number of intermediate stage modules provided for the second data switch is twice as large as the number of intermediate stage modules provided for the first switch. In an embodiment, each of the data paths interconnecting an input stage module with an intermediate stage module has half the data rate in the second data switch than in the first data switch. The manufacturer further can provide input, output and intermediate stage modules for a third data switch, wherein all of the input modules provided for both the second and third data switches are identical in the logic they contain, all of the intermediate stage modules provided for both the second and third data switches are identical in the logic they contain, the number of input modules provided for the third data switch is twice as large as the number of input modules provided for the second data switch, the number of intermediate stage modules provided for the third data switch is twice as large as the number of intermediate stage modules provided for the second switch, and each of the data paths interconnecting an input stage module with an intermediate stage module has half the data rate in the third data switch as in the second data switch. Many other variations will be apparent.

Although the modules of FIG. 1 are in one embodiment implemented as separate integrated circuit chips, as used herein, the term "module" is not intended to require this. As the term is used herein, two "modules" can exist on a single chip or single card, or one module can span multiple chips or cards. Where one module spans multiple chips or cards which themselves are also "modules", the chips or cards spanned may sometimes be referred to herein as "sub-modules".

Switching fabrics according to the invention are suitable for many products, including but not limited to ethernet switches, access routers, MAN switches, server switches, core MPLS routers, and SANs. Inherent support for multicast replication greatly expands the number and kinds of applications for which the fabric can be used, thereby significantly enhancing its commercial viability. The innovative architecture results in cost, performance, and scalability characteristics that are greatly superior to those of previously known products.

The fabric of FIG. 1 transports fixed size frames, or alternatively transports variable-size frames—from a few bytes to jumbo—without losses. The fabric supports three classes of service: Time-Sensitive (TS), Bandwidth-Provisioned (BProv), and Best-Efforts (BE). It switches Time-Sensitive frames with the highest priority. In the absence of Time-Sensitive traffic, the fabric transports Bandwidth-Provisioned frames, and then Best-Efforts frames. When suitably policed by the line cards upstream of the fabric, frames are transported across the fabric with short latency. The fabric also guarantees a minimum bandwidth to the stream of Bandwidth-Provisioned frames between each input/output pair of line cards. The fabric switches Best-Effort frames with the maximum throughput possible given the topology of the fabric. In particular, the fabric of FIG. 1 can be non-blocking with an appropriate topology. That is, it can sustain any set of rates that do not saturate fabric output ports. In addition, the fabric supports multicast with the maximum possible throughput.

Incoming data belongs to one of the three predefined classes of data. In some embodiments the data classes correspond to classes of service, but other embodiments can distinguish data classes according to other kinds of principles. In one particular embodiment, all incoming data is considered to be of a single data class for purpose of the striping algorithm, even though they might be of several classes "of service." Typically the fabric can make its internal routing decisions independently (or substantially independently) for each class of data if the fabric maintains the various queues in the fabric separately for each class. That is, a fabric that supports more than one data class typically (but not necessarily) also maintains parallel queues for each class at each node in the fabric, maintaining separate queue lengths for each of the parallel queues and filling them separately according to (among other things) the class of each data segment received. In addition, though one embodiment uses the same load balancing algorithm for each class of data, another embodiment can use different load balancing algorithms for data of different classes.

As used herein, the term "packet" refers to a variable size protocol data unit generated according to any protocol. A "block" of data is considered herein to refer to a packet that has a fixed length. A block, therefore, as used herein, is a special case of a packet. A "data segment", as used herein, implies nothing more than a segment of data. Thus it is generic to packets, blocks, frames, cells, and portions thereof, and any other grouping of data of any length, fixed or variable. A "frame" is a data segment being processed through the particular fabric described herein, and in particular may include both a packet as well as additional header information needed only while the packet is within the fabric. In some embodiments the header information may change as the frame progresses through the fabric.

The fabric of FIG. 1 has standard interfaces and can be attached directly to some network processors without additional interface chips. As described in more detail hereinafter, the striping mechanisms of the fabric are distributed and implemented in the input modules 116. Consequently, the fabric does not require a separate global striping manager, thereby greatly improving scalability.

Figure 2:
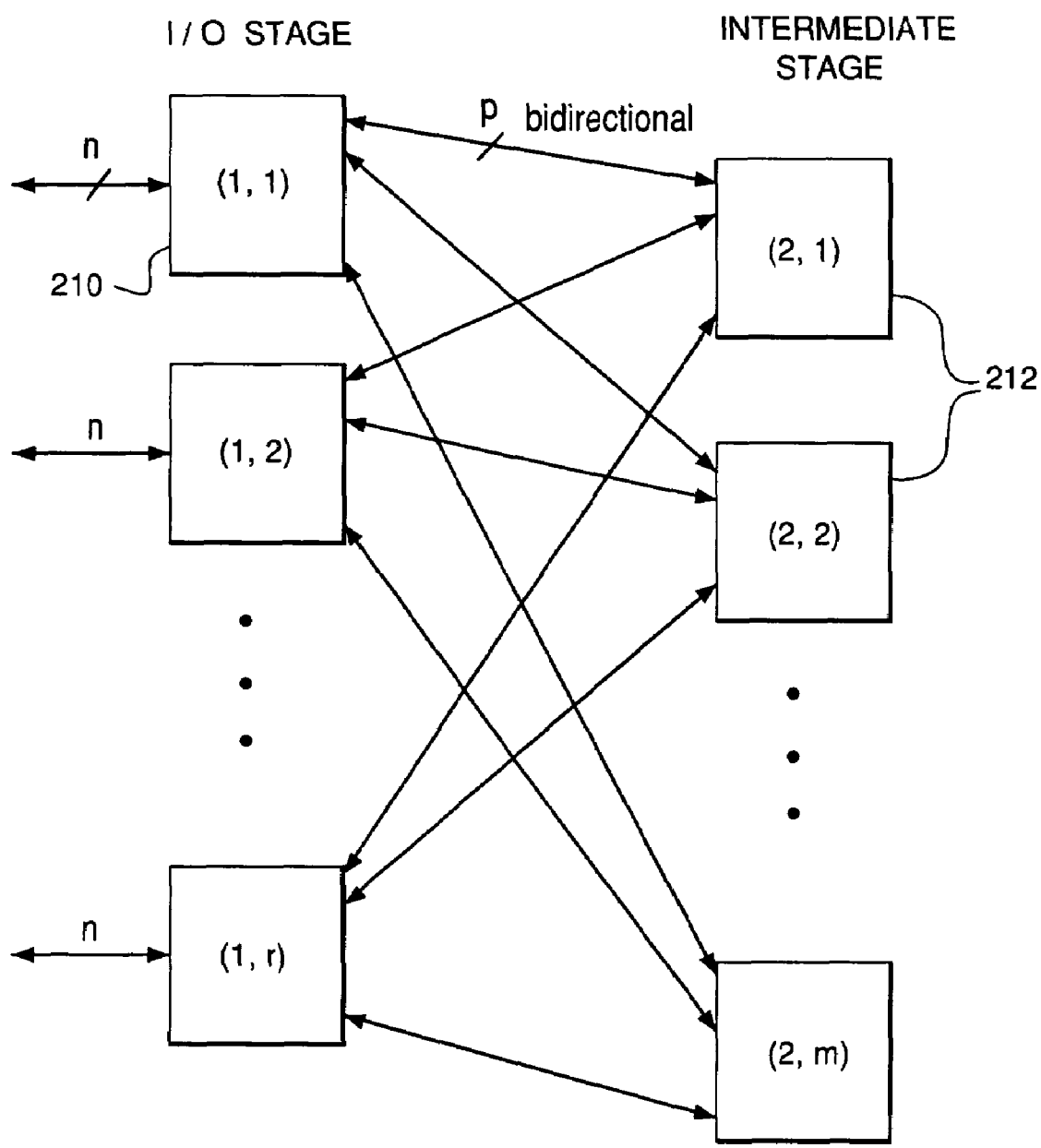

The fabric of FIG. 1 preferably can be implemented in a "folded" topology such as that shown in FIG. 2. In this topology, one input module 116 is combined onto a single chip with an output module 120 to thereby form an I/O stage module 210. Instead of separate input and output data paths to separate input and output line cards, the folded topology fabric of FIG. 2 has a bidirectional data port coupling each of the line cards to and I/O stage module 210. Similarly, the data paths between I/O stage modules 210 and intermediate stage modules 212 are bidirectional. The folded topology of FIG. 2 provides certain known advantages over the flat topology of FIG. 1, but is equivalent for purposes of the striping algorithms. For clarity of discussion and illustration, therefore, the topology illustrated in FIG. 1 will be used in the following discussions and it will be understood that the discussions could equally well apply to an equivalent folded topology.

Returning to FIG. 1, in an example system, n=8, r=4, m=2. The chips are designed to support a net input/output data rate of 10 Gbps on each input and output link, plus a speedup of at least 30 percent, plus fabric framing overhead. A necessary condition to full throughput (nonblocking operation), therefore, is that the data links between the input modules 116 and the intermediate stage modules 118, as well as the data links between the intermediate stage modules 118 and the output modules 120, each support a net data rate of 40 Gbps. This can be accomplished with four parallel data links of 10 Gbps each (i.e., p=4). Another necessary condition to full throughput, however, is that the striping algorithm be satisfactory. An innovative and unique striping algorithm that achieves this goal is described herein. The algorithm distributes traffic evenly across the fabric to avoid hot spots, even in the context of multicast. The striping algorithm is implemented independently in each of the input modules 116, although in another, less preferred embodiment, it could be implemented globally over the entire input stage 110.

Figure 3:
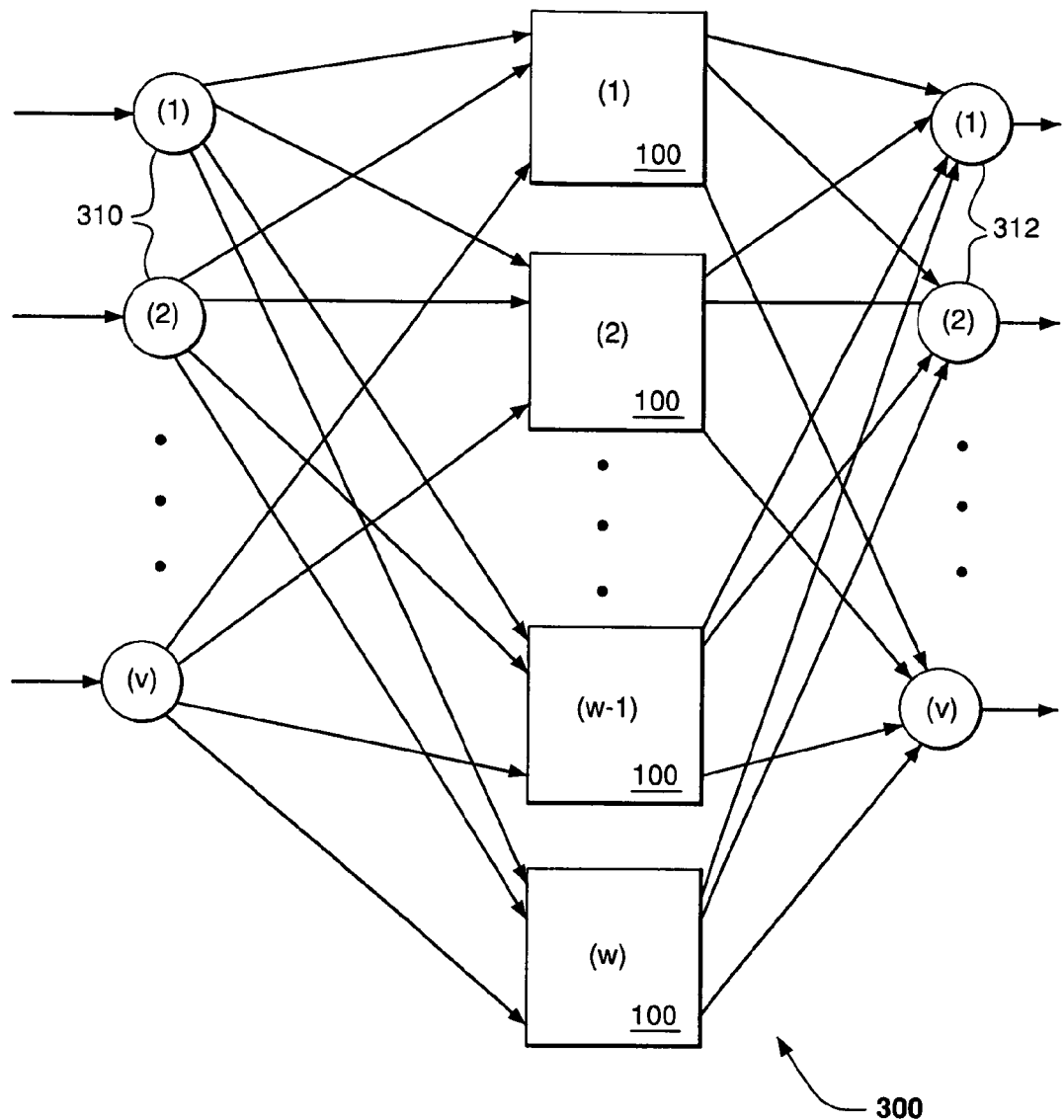

The fabric 100 of FIG. 1 is sometimes referred to herein as a CCC fabric, reflecting that data flows through three Cashmere integrated circuit chips as it progresses through the fabric. FIG. 3 illustrates another fabric architecture 300, which includes w complete CCC fabrics 100 arranged in parallel. Preferably the fabric 300 includes at least one more CCC fabric 100 than strictly necessary, to thereby provide redundancy. The CCC fabrics 100 are arranged in the topology of FIG. 3 as intermediate stage modules in the overall fabric. A corresponding folded topology is also possible. The topology of FIG. 3 also includes v input modules 310, and v output modules 312. In general the input and output modules 310 and 312 each can have multiple input and output ports connecting to multiple line cards. In the embodiment of FIG. 3, however, each of the input and output modules 310 and 312 serves only a single corresponding line card. In the embodiment of FIG. 3, the net data rate between a line card and its corresponding input or output module 310 or 312 is four times the net data rate of each of the data links between the input modules 310 and the CCC fabrics 100 or between the CCC fabrics 100 and the output modules 312. For example, if the net data rate of each of the links between input modules 310 and CCC fabrics 100 is 10 Gbps, then the net data rate between a line card (not shown) and its input module 310 might be 40 Gbps. Because each input and output module 310 and 312 serves only one line card, they can be implemented more simply than the Cashmere integrated circuit chip. In an embodiment, for a folded topology corresponding to that of FIG. 3, one input module 310 is combined with one output module 312 on a single I/O module sometimes referred to herein as a Pashmina integrated circuit chip. The overall topology of FIG. 3 is sometimes referred to herein as a PCCCP topology, because data passes through a Pashmina chip, a CCC network, and then a Pashmina chip as it progresses across the fabric.

Returning again to FIG. 1, at the ingress, the line cards mark the variable-size frames with the class of service and a routing tag that together define a "thread" or a "multicast group." A "thread" is a triplet identifying a source line card (fabric input port), a destination line card (fabric output port), and a class. The fabric also includes the concept of a "microbundle", which is a bundle of all the threads originating from a common input module. A microbundle is therefore a triplet identifying a source input module, a fabric output port, and a class. The classes in the present embodiment are distinguished by classes of service (TS, BProv or BE), but in other embodiments they can be distinguished by any mechanism desired. A "multicast group" is a group of one or more output ports to which the incoming packet is destined. A "multicast tree" is a triple (input port, set of output ports, class). Multicast trees are provisioned into the fabric and stored in a memory so that they can be referred to in the frame header by multicast tree number. Multicast copying occurs in the intermediate stage modules 118 and in the output modules 120. Multicast copying is supported only for classes BP and BE, not for the TS class. Because the fabric 100 supports multicasting, it is sometimes referred to herein as a multicasting fabric. As used herein, however, "multicast" is a capability, not a requirement. A multicasting fabric does not become a unicast fabric only because all the frames that it transports in a particular application happen to be limited to unicast frames. Nor does a multicast input flow become a unicast flow only because all of its frames happen to be destined for only one output port. The data flow is still considered herein to be a "multicast" data flow, because the system has the capability to transport the flow even if destined for more than one output port. As an example, although the present embodiment distinguishes between unicast and multicast frames and queues them separately, it will be appreciated that another embodiment might not make any such a distinction; in an embodiment of the latter kind, frames are not typed according to casting at all. All frames might identify a multicast tree, and a frame destined for only one output port might be distinguishable from a frame destined for more than one output port only by the number of output ports listed in the frame's multicast tree.

Input Stage Module

Figure 4:
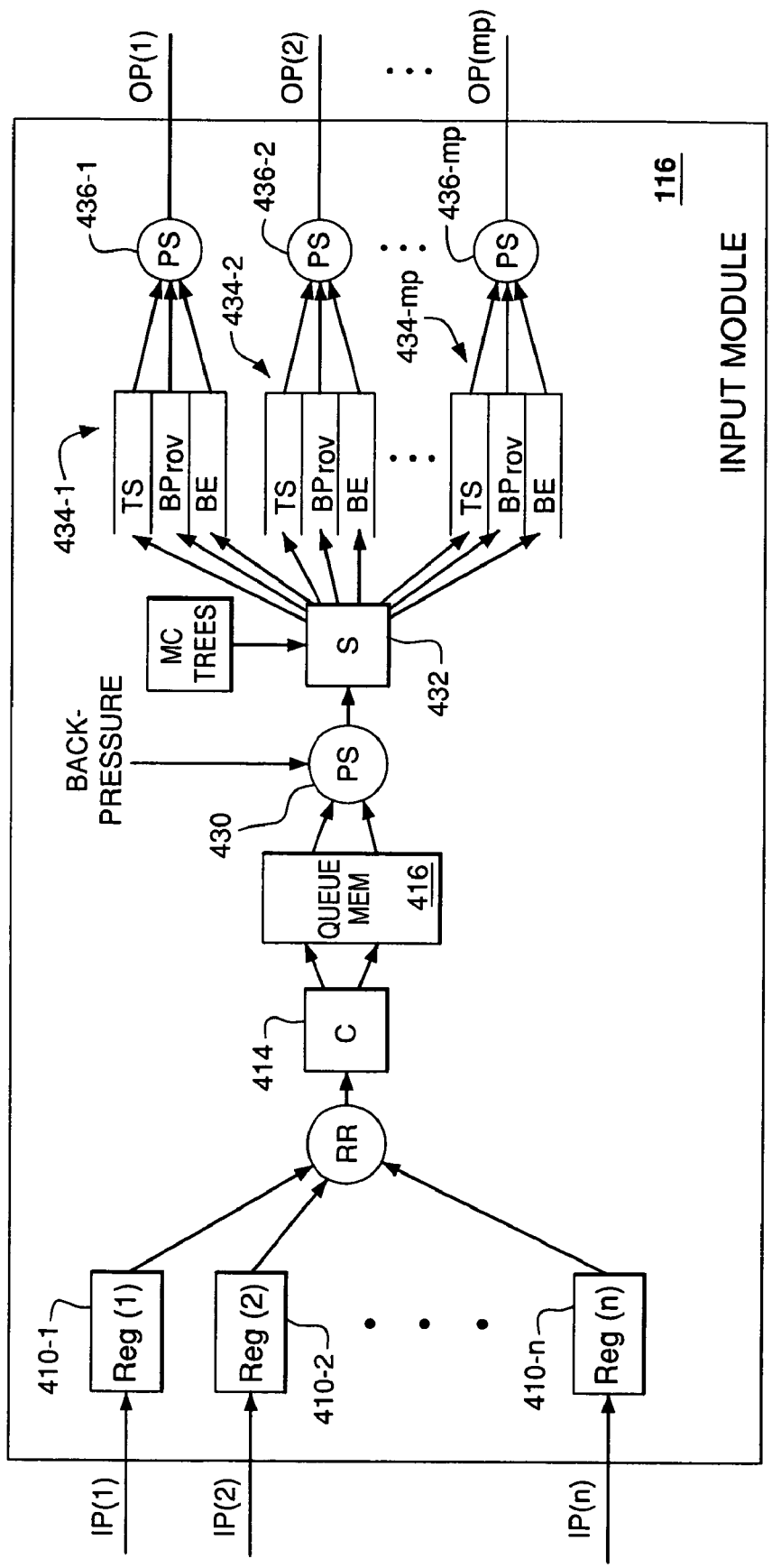
FIG. 4 is a functional block diagram of pertinent components of one of the input modules in FIG. 1.

FIG. 4 is a functional block diagram of pertinent components of one of the input modules 116. In this diagram, as well as in other functional diagrams herein, certain functional units are illustrated as being upstream or downstream from other functional units in a data path. As will be apparent, however, many of the processing elements in the diagram can be interchanged in sequence, or performed by indirect manipulation of the data path rather than as part of it. Other processing elements not shown in the diagrams also can be inserted at various points in the data path. These diagrams are intended only to illustrate functions performed, not the sequence or structure by which they are performed.

Referring to FIG. 4, variable sized frames arrived on the input ports 1-n and are placed into input registers 410-1 through 410-n (collectively 410). The input registers 410 are served in round-robin order, and the frames are classified in a classifier 414 and sent to one of a number of queues, all stored in a queue memory 416. The queue memory 416 maintains the following queues, for example as virtual queues stored as linked lists in the memory. In an alternative embodiment, each queue can occupy its own separate memory or its own pre-allocated region of a shared memory. In either case, preferably the queues described herein contain only descriptors of the data segments they represent. The data itself is stored in a common memory.

- n time sensitive (TS-class) queues (one for each input port of the module)
- n×r bandwidth provisioned-Unicast (BProv-class unicast) queues (one for each fabric output port)
- n bandwidth provisioned-Multicast (BProv-class multicast) queues (one for each module input port)
- n×r best efforts-Unicast (BE-class unicast) queues (one for each fabric output port); and
- n best efforts-multicast (BE-class multicast) queues (one for each module input port).

As an example, in a fabric 100 which includes 16 input modules 116, 16 output modules 120 and 8 ports per input/output module (n=8, r=16), each input module 116 includes a total of 304 queues: 8 time sensitive queues, 128 bandwidth provisioned-unicast queues, 8 bandwidth provisioned-multicast queues, 128 best efforts-unicast queues and 8 best efforts-multicast queues. The multiplicity of queues are provided to implement a fair queuing algorithm, incorporating for a scheduling among the different classes, and per-thread flow control for bandwidth provisioned class traffic and best efforts traffic. Not all queues are used in every topology.

A priority scheduler 430 chooses the next frame for striping from the input module 116, from among all the queues that are neither empty nor backpressured. The queue can be backpressured for any of several reasons, only one of which is relevant to the present discussion. This form of backpressure is described hereinafter. The priority scheduler 430 chooses the next frame according to the following algorithm, which might be performed serially or in parallel in various embodiments, or partially serially and partially in parallel:

1. Choose a class:
    The class is chosen in priority order: TS, BProv, then BE. If the TS queue is non-empty and non-backpressured, then the TS class is chosen. Otherwise, if any BProv queue (unicast or multicast) is non-empty and not backpressured, then the BProv class is chosen. Otherwise, if any BE queue (unicast or multicast) is non-empty and not backpressured, then the BE class is chosen. Otherwise, repeat the test in the same order until a queue is found that is non-empty and not backpressured.
2. Within the chosen class, choose a casting type (unicast/multicast):
    If the chosen class is one that supports multicasting (BProv or BE in the present embodiment), then the casting type is also chosen in priority order: unicast then multicast. If any unicast queue of the chosen class is non-empty and not backpressured, then Unicast is chosen. Otherwise, Multicast is chosen. (In an alternative embodiment, the choice between unicast and multicast is made by a WRR scheduler).
3. Within the chosen class and casting type, choose an individual queue using DRR scheduling. In another embodiment, the individual queue choice can be made using DWRR scheduling.

Once the priority scheduler 430 determines the queue from which to take the next frame, a striper 432 uses a striping algorithm to determine along which of the mp possible routes through the fabric to send the chosen frame. The details of the striping algorithm are described hereinafter. The input module then places the frame that is at the head of the queue chosen by the priority scheduler 430, into the input module 116 transmit port queue 434-1 . . . 434-mp (collectively 434) for the route chosen by the striper 432. As used herein, a "route from the input module" is considered to begin immediately after the striping function, even though the packet might still be physically within the same integrated circuit chip. Each output port of the input module 116 has associated therewith three transmit queues, one per class of service. In one embodiment, all of the transmit queues 434 share a common memory, with the data being stored in a linked list manner as in the input module 116. In another embodiment, bandwidth limitations require each of the transmit queues to be allocated a separate memory or separate region of memory. The transmit queues 434 preferably store only descriptors of the data segments to be transmitted. The data itself remains in queue memory 416 until all required copies of the data segment have been read out the output ports.

The transmit queues 434 are provided because once the striper identifies the next packet to send out on a given output port, the module might not be able to transmit the selected packet immediately. For example, it is possible for the striper 432 to stripe two consecutive packets to the same transmit port. In this case the transmit queue for that output port will hold the second packet until the first packet leaves. If instead the striper were to hold the second packet back, by pausing the striping operation, other transmit ports may go idle. So the striper continues selecting next packets and placing their descriptors into the appropriate transmit queues until there are a few packets in each transmit queue, or more accurately, until one of the transmit queues reach a threshold depth. If the striping algorithm is balancing well, then the other transmit queues should have a similar depth as the longest transmit queue. The striper resumes selecting next packets when the transmit queues fall below a lower threshold.

Once an output port is ready to transmit a packet whose descriptor has been placed in the associated transmit queue 434, a priority scheduler 436-1 . . . 436-mp (collectively 436) associated with the output port selects the next packet to transmit on its associated output port, from among the three class-of-service-based transmit queues 434 associated with that output port, in strict priority order. That is, if the time sensitive queue associated with the output port is non-empty, then the priority scheduler selects the head packet in the time sensitive queue. If not, and if the bandwidth provisioned queue associated with the output port is non-empty, then the priority scheduler selects the head packet in the bandwidth provisioned queue. Only if both the time sensitive queue nor the bandwidth provisioned queue associated with the output port are empty, will the priority scheduler selects the head packet in the best efforts queue associated with the output port.

Once the transmission of packet data out the output port begins, with one exception, the transmission continues until the frame is completed. The exception occurs if a TS frame becomes available in the same transmit queue 434 that is already transmitting a bandwidth provisioned frame or a best efforts frame. A TS frame can interrupt a BProv or BE frame, on a block boundary, after only part of it has been sent. The interruption of a frame does not affect operation of the striping algorithm because all frames represented in the particular transmit queue 434, regardless of class of service, are already destined for the same route.

As used herein, a striper is considered to have "sent" a packet when it has completed its work with respect to that packet. In the module of FIG. 4, this occurs when the descriptor of the striped packet has been placed into the appropriate transmit queue 434.

Intermediate Stage Module

Figure 5:
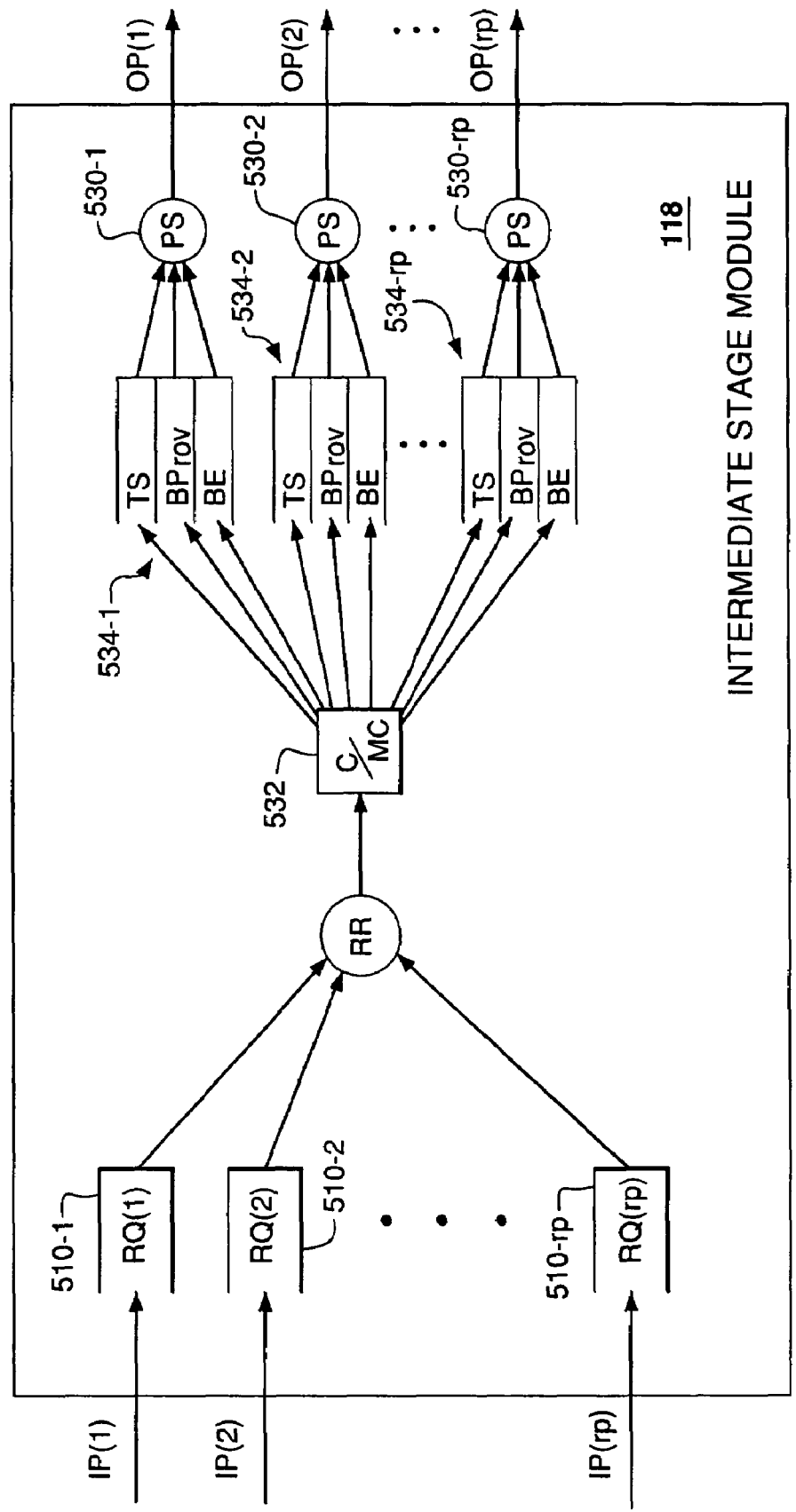
FIG. 5 is a functional block diagram of pertinent components of one of the intermediate stage modules in FIG. 1.

FIG. 5 is a functional block diagram of pertinent components of one of the intermediate stage modules 118. Frames arrive to the intermediate stage module 118 on the input ports 1-rp are placed into receive queues 510-1 through 510-rp (collectively 510). As mentioned, in topologies in where p>1, several of the input ports are connected to the output ports of a single one of the input modules 116. The receive queues 510 are served in round-robin order, and the frames are classified and forwarded by a classifier and multicast copier 532 to the appropriate one or ones of a bank of transmit queues 534-1 . . . 534-rp (collectively 534). Each output port of the intermediate stage module 118 has associated therewith three transmit queues, one per class of service. In one embodiment, all of the transmit queues 534 share a common memory, with the data being stored in a linked list manner. In the present embodiment, however, bandwidth limitations require each of the transmit queues 534 to be allocated a separate memory or separate region of memory. Also, the transmit queues 534 preferably store only descriptors of the data segments, with the data segments themselves being held in a common memory. Thus the intermediate stage module 118 contains rp time sensitive transmit queues, rp bandwidth provisioned transmit queues, and rp best efforts transmit queues, for a total of 3rp separate data queues. It will be appreciated that since the integrated circuit chip is designed for use in a wide variety of topologies, a given topology might not utilize all rp input ports or rp output ports. The full quantity of rp input ports and rp output ports nevertheless exist in the module so as to be available for topologies that do require them.

The intermediate stage module 118 also includes priority schedulers 530-1 . . . 530-rp (collectively 530), one for each of the output ports of the intermediate stage module 118. As with the per-port priority schedulers 436 in the input module 116, each priority scheduler 530 selects the next packet to transmit on its associated output port, from among the three transmit queues 534 associated with that output port, in strict priority order.

No sophisticated striper is needed in the intermediate stage module 118, because no complex routing choices exist in the intermediate stage. By the time a frame reaches the intermediate stage 112, there is only one route to the frame's destination output port (to each of the frame's destination output ports, in the case of multicast): via the output port connected to the particular output module 120 that contains the desired output port. The intermediate stage module 118 does include a striper (not shown), but it is very simple and comes into play only in topologies that include more than one data link from an input module to an intermediate stage module and from an intermediate stage module to an output module (p>1). In particular, a one-to-one correspondence is made between data links incoming to the intermediate stage module 118 and data links outgoing from the intermediate stage module 118. The striper in the intermediate stage module then always sends a frame out the outgoing data link that corresponds to the data link on which it was received from an input module.

This rule not only simplifies the intermediate stage striper, but also simplifies the reordering problem in the output modules. If one allows packets to traverse all possible pairings of links (pair of $1^{st}$-$2^{nd}$ stage and $2^{nd}$-$3^{rd}$ stage links), the number of paths via a particular middle stage device to a particular output device would be $p^2$ rather than p. Packets that traverse the same path cannot "pass" each other. So the reorder problem is made easier by constraining the packets to as few paths as possible, but still having enough paths to have sufficient bandwidth. This is achieved by having a one to one mapping between the p incoming links from any first stage device to the p outgoing links to any third stage device.

Output Stage Module

Figure 6:
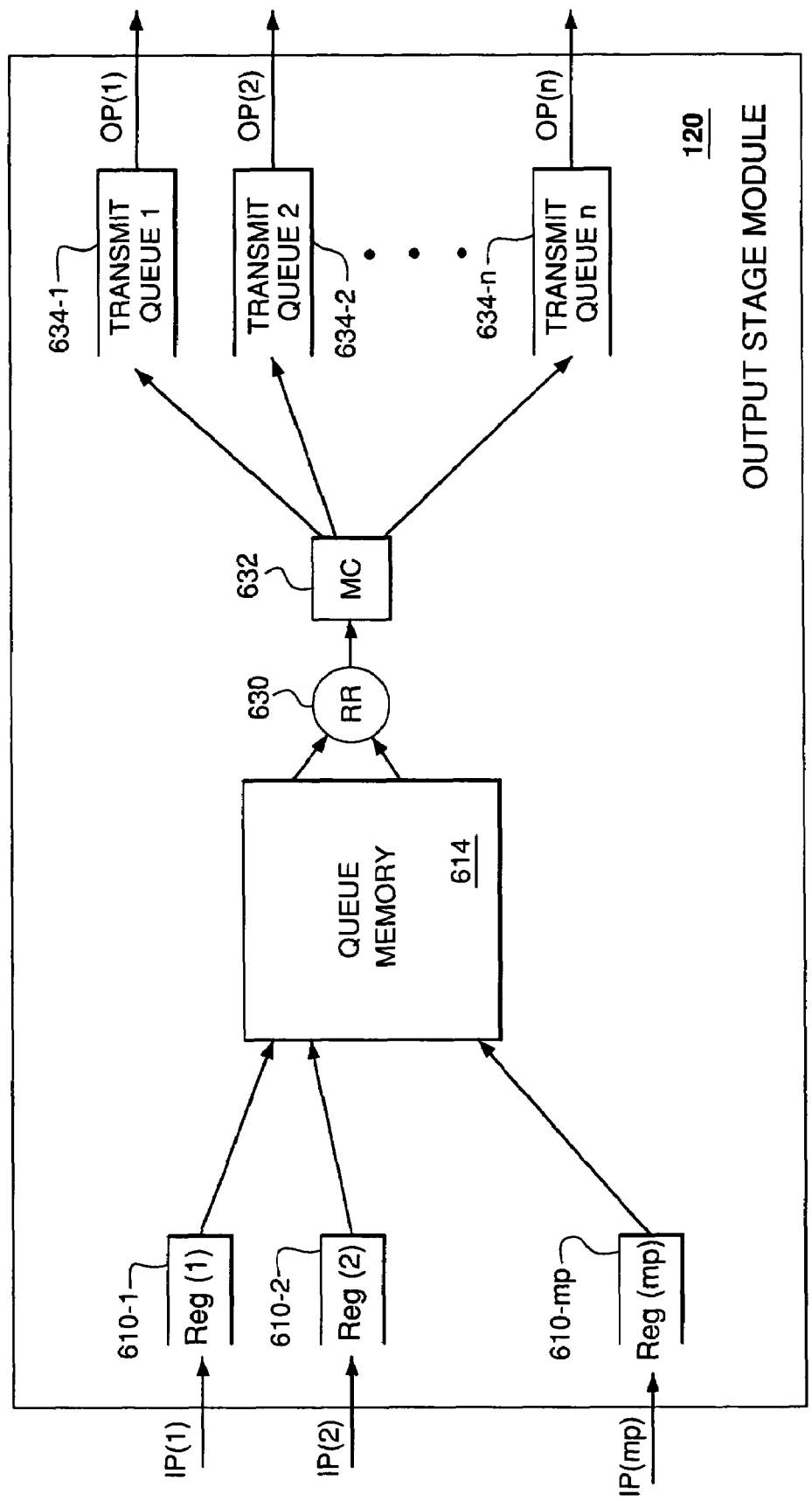
FIG. 6 is a functional block diagram of pertinent components of one of the output modules in FIG. 1.

FIG. 6 is a functional block diagram of pertinent components of one of the output modules 120. As with the input stage modules 116, frames arrive to the output module 120 on input ports (1-mp) and are placed into input registers 610-1 through 610-mp (collectively 610). In topologies where p>1, several of the input ports are connected to output ports of a single one of the intermediate stage modules 118. The input registers 610 are served in round-robin order, and the frames are re-ordered as necessary into queue memory 614. Any appropriate re-ordering algorithm can be used; its details are unimportant for an understanding of the present invention.

The output module 120 also includes a round robin scheduler 630 which selects each next frame in a round robin fashion from among all the eligible queues in queue memory 614. Once the next frame is chosen, a multicast copier 632 performs any multicast copying required by the frame and copies the frame out into the appropriate one or ones of the n transmit queues 634-1 through 634-n (collectively 634) for transmitting on the modules output ports. Like the input module 116 and the intermediate stage module 118, the transmit queues 634 in the output module 120 is divided by class of service and is followed by a per-port priority scheduler (not shown in FIG. 6).

Generalized Striping Algorithm

The objective of striping is to balance the flows through the fabric. Consider the fabric shown in FIG. 7, in which n=2, r=4, m=2 and p=1. Input module (1,1) can send each frame either via module (2,1) or via module (2,2), and each intermediate stage module maintains an output queue for each of the output modules. In this discussion the intermediate stage module output queues are numbered Qij, where i is the intermediate stage module number and j is the output module number.

The Cashmere fabric makes striping decisions frame by frame. That is, input module (1,1) sends the entire frame through the same intermediate stage module, even if interrupted midway for transmission of a TS frame. The striping algorithm attempts to balance the traffic to achieve the maximum possible utilization and also to minimize the reordering memory required in the output modules.

To appreciate the reordering problem, consider frames that input module (1,1) sends for output module (3,3). Some of these frames go through queue Q13 and the others through queue Q23. If the lengths of these queues are comparable, then the frames that input module (1,1) sends consecutively and follow different paths arrive at about the same time in output module (3,3) and the reordering memory required in output module (3,3) is small. The striping algorithm attempts to keep the queue length of Q1j similar to the length of Q2j, for each j=1, . . . , 4. In the algorithm, input module (1,1) does not need to know these queue lengths. Input module (1,1) sends similar numbers of blocks to queues Q1j and Q2j. The other input modules (1,2), (1,3) and (1,4) do the same. Consequently, the arrivals into these queues are well-balanced and the queue lengths remain similar.

Unlike conventional striping algorithms, the algorithm in the present embodiment takes into account multicast frames that are to be replicated by the intermediate stage modules. Consider a flow of multicast frames received by input module (1,1) for transmission to output ports O1, O5, O6 and O8.

Figure 7:
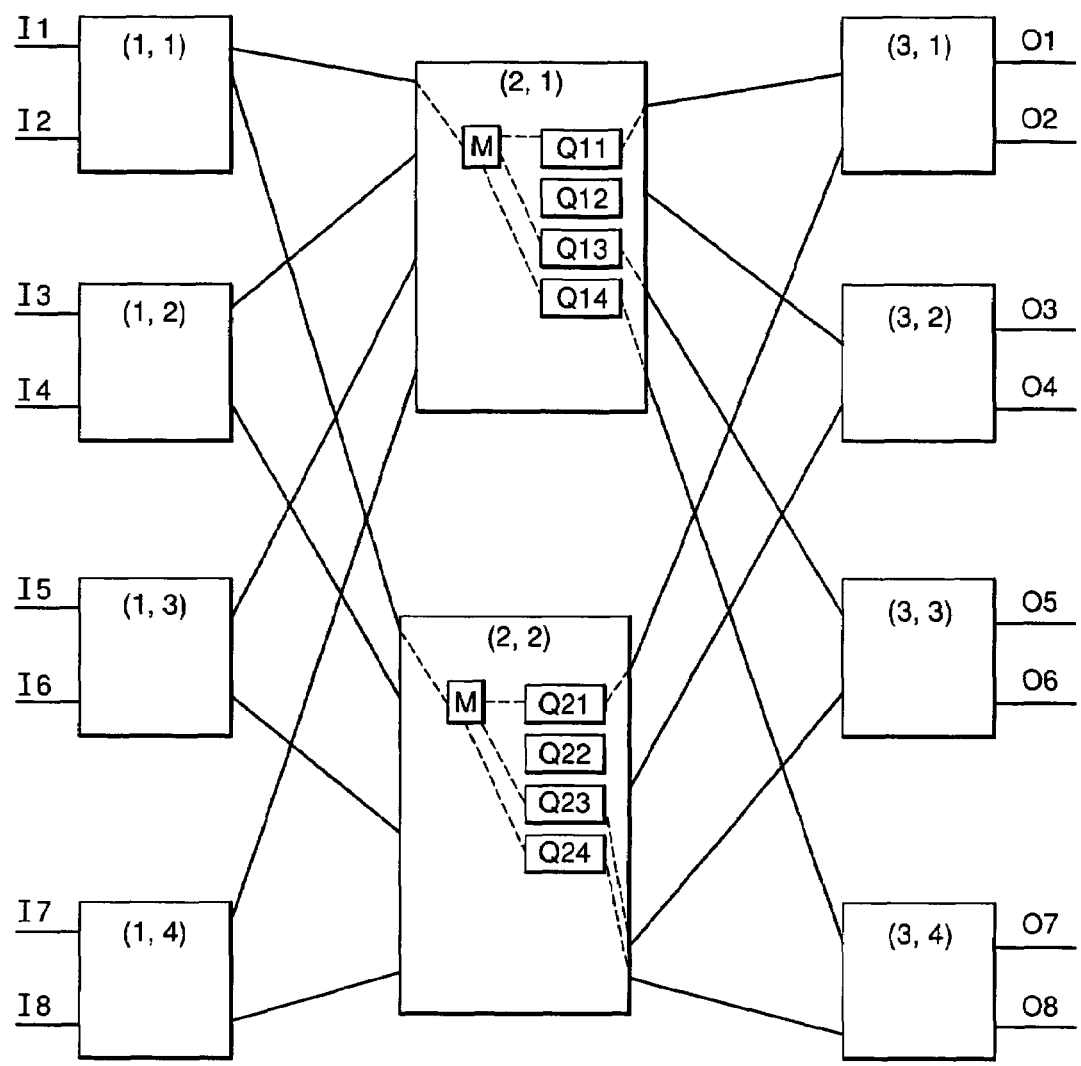

FIG. 7 illustrates by dashed lines the two groups of routes that a given one of the frames can take. Input module (1,1) must choose where to send the next frame of this multicast: either (2,1) or (2,2). Input module (1,1) bases that choice on the number of bytes that it has sent so far to the queues Q11, Q13, Q14, Q21, Q23 and Q24. In particular, if q(i,j) is the number of bytes that input module (1,1) has sent up to now to queue Qij, then input module (1,1) sends the next frame to (2,1) if $$q(1,1)+q(1,3)+q(1,4) < q(2,1)+q(2,3)+q(2,4).$$

Otherwise, it sends the frame to (2,2). The justification for this algorithm is that if input module (1,1) sends that frame to (2,1), then (2,1) replicates it and sends one copy to Q11, one to Q13, and one to Q14.

Stated more generally, and incorporating the fact that an embodiment can define a data class c only within which the algorithm operates, the striping algorithm transmits each data segment via an intermediate stage module i, where i minimizes $$q(i,a(G),c)+q(i,b(G),c)+\ldots+q(i,k(G),c);$$

where:
- q(i, j, c) indicates the number of bytes of data of each class c sent previously from the first input stage to each j'th one of the output modules via each i'th one of the intermediate stage modules,
- G is a multicast group of at least one output port to which the given data segment is destined,
- a(G), b(G), . . . , and k(G) are the output modules having the output port(s) in multicast group G, and
- c is the class of the data segment.

Generally, where more than one of the available intermediate stage modules i tie for the minimum sum, each intermediate stage module i in the tie is considered herein to satisfy the above test. That is, the input module can choose any route having the minimum sum. Preferably, however, the tie-breaking algorithm should be one that minimizes or eliminates any bias toward one route or another. In one embodiment, ties are broken in a round-robin sequence. In another embodiment, the ties are broken in a pseudo-random sequence. Most preferably, ties are broken according to an order of precedence that rotates, for example on every cycle. As an example, in one cycle the order might be route 1, route 2, . . . , route m, meaning that in that cycle if all sums were the same then route 1 would be chosen. If only routes 3 and 5 were tied for the minimum sum, then route 3 would be chosen because during that cycle it precedes route 5 in the order of precedence. In the next clock cycle, the order of precedence rotates to: 2, 3, . . . , 8, 1, and so on.

The above algorithm (including all tie-breaking algorithms) is sometimes referred to herein as a Min.Sum algorithm. It bears a similarity to the conventional DRR striping algorithm, although the Min.Sum algorithm takes account of multicast replication in the downstream intermediate stage queues, not just the number of bytes sent from the subject input module. Conventional DRR algorithms also may not include the rotating precedence tie-breaking algorithm described above.

The subject input module typically includes in its q(i, j, c) counts all the data segments that it forwarded into the fabric since power-on reset, but in another embodiment, the time period over which the counts are maintained can begin at some other time prior to the present data segment. For example, one embodiment clears the entire fabric periodically, or whenever a particular trigger event occurs, allowing all the queues to empty and resetting or synchronizing all the q(i, j, c) counters in the input module.

The above Min.Sum algorithm is also advantageous in that each input module bases its striping decisions only on information about its own prior transmissions to the intermediate stage; it does not need to know about transmissions from other input modules. It therefore can be implemented independently in each input module, and unlike a global striping mechanism, it does not need to grow more complex as additional input ports are added to the input stage. Instead, the additional input ports are added by way of additional input modules, each of which can carry its own separate striping mechanism. Nor does the striping mechanism in any input module need to receive messages about transmissions by other input modules. It can be seen that the highly distributed nature of the striping algorithm described herein can greatly enhance the scalability of a fabric that uses it. Nevertheless, the striping algorithm could, if desired, be implemented globally.

While the above Min.Sum algorithm uses the minimum sum of the queue lengths as the decision factor, it will be appreciated that other embodiments can use other comparisons of other functions of the queue lengths, such as the minimizing the sum of the squares, minimizing the sum of reduced-precision versions of the queue lengths, maximizing the maximum queue count, and so on. However, the minimum sum is the preferred decision factor. Note also that in some embodiments, the q(i, j, c) counts might not be maintained as strictly numerical count values. They could be maintained in any fashion that indicates or identifies at least the number of data bytes that the subject input module has sent via intermediate module i with a destination of output module j, relative to the number of data bytes that the subject input module has sent via any other route to the output stage. As used herein, a count "indicates" or "identifies" a number of bytes if it can be translated by a known algorithm to the number of bytes. For example, if all data segments are of equal size, say 500 bytes, it would be unnecessary to increment the counters by 500 for each block transmitted. Instead, it would be sufficient to increment the counters by 1 for each block transmitted, because it is known that the number of bytes transmitted can be determined by multiplying the number in the counter by 500. In this case the number in the counter "indicates" the number of bytes transmitted because the number in the counter can be translated to the number of bytes by the known algorithm of multiplication by 500. As another example, since it is only the relative numbers of bytes sent that is of concern to the algorithm, instead of always incrementing the q(i, j, c) counter for a given data segment sent to output module j via intermediate stage module i, an implementation can sometimes or always decrement the q(i, j, c) for certain other routes. Note finally that the known algorithm need not be purely arithmetic; lookup tables can also be included as part or all of the algorithm. As used herein, the increasing of one count "relative" to another can be implemented either by increasing the first count and leaving the second count unchanged, or by decreasing the second count and leaving the first count unchanged, or by a combination of changes (increases and/or decreases) made to both counts.

In the present embodiment, the value that the striper maintains for each route through the fabric indicates the relative number of bytes of data that have been sent along each route originating from the subject input module. This is because in the present embodiment, the cause of blocking operation that has been targeted for elimination is based on numbers of bytes of data specifically when the intermediate stage output queues have too widely disparate numbers of bytes of data.

That is, in the present embodiment, the number of bytes of data traversing each route is the relevant measure of channel loading. In another embodiment, the relevant measure of channel loading might be the number of packets traversing each route, regardless of their length. This might be the case where, for example, the intermediate stage output queues allocate a fixed amount of memory for each packet regardless of the length of data in the packet. In such an embodiment, the value that the striper maintains for each route through the fabric might indicate the relative number of packets that have been sent along each route. In general, any measure of channel loading can be kept track of in the q(i, j, c). Where different routes have different data rates, the measure of channel loading can be based on a history of prior transmissions normalized by the route data rate. Preferably the measure matches the primary cause of blocking operation in the particular fabric, but other measures can be used instead if desired. The measure also preferably matches the impact on channel loading exactly, although approximations can be used instead. The algorithm therefore is further generalizeable in that it selects the intermediate stage module through which to route the next data segment by some mechanism that depends upon the relative prior channel loading of each available route from the input module to an output module. As used herein, a "route" or "channel" through the switching fabric defines a single input module, a single intermediate stage module and a single output module. If a data frame is replicated in the intermediate stage module and forwarded to more than one output module, then that data frame is considered herein to have traversed each of the routes or channels that brought it to the output stage.

As mentioned, for some topologies, full throughput requires the data rates to be greater within the fabric than between the fabric and an external input or output line card. In some embodiments, the increased data rates are supported on single data links within the fabric, but in other embodiments, the data rate on individual data links is not increased. Instead, the number of data links from each input module to each intermediate stage module and from each intermediate stage module to each output module is increased (p>1). In such an embodiment, the striper must select not only the intermediate module through which to send the next data segment, but also which individual data link to use. The latter decision can be made either as a second decision step, following the selection of the intermediate stage module, or preferably it can be made as part of the basic striping decision. In the present embodiment, the striper incorporates the data link selection as part of the basic striping decision by considering each data link output of the input module as a separate route. Thus it maintains separate queue counts for each data link output that is enabled in the fabric topology, rather than for each intermediate stage module of the fabric. When the striper finds the minimum sum for a given data packet, the sum identifies a particular output data link rather than merely a particular intermediate module. It will be appreciated that selection of a particular output data link in a static topology carries with it the implied selection of a particular intermediate stage module. As used herein, therefore, selection of an output data link in a static topology is considered to include the selection of an intermediate stage module. Note that in a different embodiment, multiple data links to an intermediate stage module can be considered as a single route, with the striping algorithm selecting only the intermediate stage module. Selection of a data link to that intermediate stage module could take place in a separate step, for example by RR, DRR or DWRR, or even by a separate evaluation of the same Min.Sum algorithm used in the selection of the intermediate stage module.

In topologies that include more than one data link from an input module to an intermediate stage module, typically there is also more than one data link from each intermediate stage module to each output module as well. A separate striper could be used in the intermediate stage modules to select among the p data links to a destination output module, but as previously mentioned, this could unnecessarily complicate the data reordering problem in the third stage modules. Thus, in the present embodiment, a one-to-one correspondence is made between incoming data links and outgoing data links, and the intermediate stage module always sends a frame out the outgoing data link that corresponds to the data link on which it was received from an input module. This procedure is also consistent with the notion that each the input stage striping mechanism considers each data link as a separate route, all the way to the destination output module.

As an example, in the topology of FIG. 1C, each data path internal to the fabric contains two data links (p=2). For each path, one of the data links is assigned number 1 and the other is assigned number 2. It does not matter which link is assigned which number, as long as the assignment remains constant over the time period in question. Then whenever a frame is received into an intermediate stage module 118, the number of the data link on which it arrived is associated with the frame and remains with the frame until output. Later, after the module determines to which destination output module(s) the frame should be forwarded, the link number associated with the frame determines which of the p data links to that destination output module should be used.

Window Flow Control

Although the striping algorithm described herein is sufficient to avoid reordering deadlock in most situations most of the time, it still might require a large amount of reordering queue memory in the output modules in some rare circumstances. Therefore, in order to avoid having to provide such large memory for such rare circumstances, one embodiment implements a windowing flow control mechanism which backpressures the flow of data from an input module to an output module when the output module's cache of frames still in its memory, plus those in-flight to that output module, exceeds a predetermined size. This flow control is performed in the present embodiment globally across all classes of service and at the level of each input module/output module pair, but in another embodiment, it can be performed at finer or coarser levels.

According to the windowing flow control mechanism, each output module j returns an ACK (acknowledge) to each input module h for each x frames the output module j has received from input module h and successfully transmitted. Each ACK is therefore said to "cover" x frames sent from input module h to output module j. Frames replicated by a multicast replicator in an intermediate module are covered by ACKs from each destination output module. An output module does not return an ACK until all x frames that it has received from the input module have been forwarded out the output port. The value of x is chosen large enough to minimize the required amount of control signaling, but small enough to provide sufficiently fine granularity of the flow control. The input module should not expect to receive the ACK covering any given set of x frames until sometime later, to allow for latency of transmission across the fabric, and for expected reordering delays in the output queues. But if the input module has not received the ACK by some limited time thereafter, then it is likely that the reordering queue memory in the output module is becoming too full. Therefore, the flow control mechanism prevents the input module from sending the y'th frame after the last frame for which it has received an ACK. If each output module shares a common memory among all its transmit queues, then the value of y can be chosen according to the size of this memory and the number of input modules that share it. For example, y can be chosen such that the amount of memory available in an output module for reordering queues is at least large enough to store a little more than r times y maximum-size frames, where r is the maximum number of input modules in any supported topology. The size of the memory is in turn chosen according to the extent to which latencies among different routes to the same output module in a particular fabric can differ and cause reordering delays. Certainly y is chosen to be larger than x (y>x), and preferably y>=2x. Even more preferably, y>=3x.

As an example, consider an embodiment in which x=200, y=600 and r=8. The size of the memory available in an output module for reordering queues is at least large enough to store a little more than 8×600=4800 maximum-size frames per class. In the example, an input module receives an ACK from each destination output module for every 200 frames that the output module has received from the input module and successfully transmitted. The input module keeps track of these ACKs, and by the time it is ready to send its 601'st frame to the output module, if it has not yet received back the first ACK (covering the first through the 200th frame), then it backpressures all input queues that include that output module as a destination. Backpressure is not removed until the first ACK is received, and then it is re-asserted for the 801'th frame to be sent to the output module if the input module has not yet received back the second ACK (covering the 201'th through 400'th frame), and so on.

ACKs preferably are numbered sequentially in this scheme with at least two bits in order to make the mechanism tolerant to lost acknowledgments. If an ACK is lost, then the next ACK received by the input module from the same output module is considered to "cover" all the data segments that the input module sent since the last received ACK, destined for the same output module. ACKs are returned to the input modules via control links across the switching fabric. In addition, if an input module is backpressured by the windowing flow control mechanism relative to one of the output modules in a multicast group, then the entire multicast group is considered backpressured and withheld from striping until backpressure is cleared to all destination output modules.

It will be appreciated that the ACKs in various embodiments do not have to indicate that the output module has successfully transmitted the covered data packets. An ACK actually means only that the output module has determined that all covered packets no longer load any channel from the input module to the output module. Depending on the embodiment, this usually means that all covered packets have already vacated the output module's queue memory, or soon will. Completion of reordering of all covered packets is an indication that they soon will vacate the output module's queue memory.

It will be appreciated further that the windowing flow control mechanism described herein is not limited in application to fabrics that use the Min.Sum striping algorithm. Rather, the mechanism provides a way to reduce the amount of queue reordering memory required in the output modules without risking reordering deadlock, regardless of the striping algorithm used. The mechanism is most useful where the striping algorithm is such that the great bulk of frame sequences can be reordered in a certain amount of memory, but additional memory is required to prevent deadlock only in rarely occurring situations. With these kinds of striping algorithms, the widowing flow control mechanism avoids the need to provide a lot of extra memory only to cover the rarely occurring situations. In addition, with optimal choices of x and y, a fabric employing both the Min.Sum algorithm and windowing flow control can effectively achieve higher throughput than a fabric employing either technique alone.

Alternative Flow Control Scheme

An alternative to the windowing flow control scheme described above is an in-flight flow control scheme as follows. In accordance with this mechanism, each intermediate stage module "supervises" the output ports of some subset of the output modules. In embodiments such as those of FIGS. 1B, 1C and 1D, there are always twice as many output stage modules as intermediate stage modules, so each intermediate stage module is assigned to supervise the output ports of two of the output stage modules. it. In addition to supervising the outputs, each intermediate stage module also receives feedforward messages telling it how many blocks have been sent from each $1^{st}$ stage module bound for the supervised destination output module. Similarly, the supervised output module sends feedback to its intermediate stage module supervisor telling it how many packets have left the output module. The supervisor combines the information in the feedforward messages with the information in the feedback messages to determine the total number of blocks "in flight" to the supervised output module. When this reaches a threshold, the supervisor transmits backpressure messages to all input modules to stop sending packets to the supervised output module. The rationale behind this is as follows. Suppose it were acceptable to have a total of X blocks in flight to a particular output module. Window flow control would try to bound the number of blocks in flight from any one input stage device to X/r. The in-flight flow control mechanism explained here would try to keep the total number of blocks in flight below X, and in cases where all input modules are not sending to this output module, would allow more than X/r blocks to be in flight from some of the input devices. This relaxation can improve throughput in some traffic scenarios.

Striving Algorithm Implementations

Figure 8:
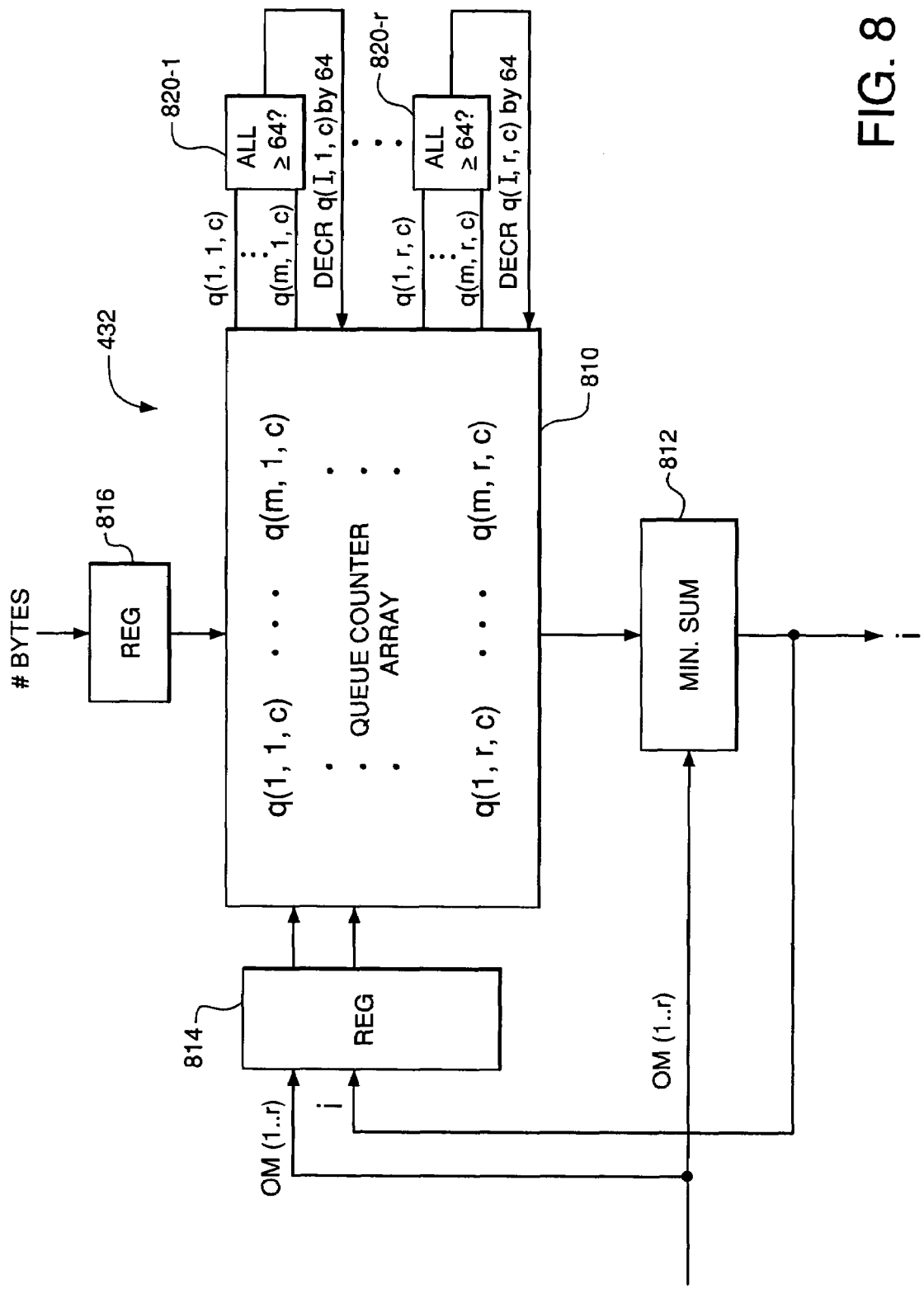
FIG. 8 is a functional block diagram of a simple striper of FIG. 4.

FIG. 8 is a functional block diagram of simple striper 432 (FIG. 4) that implements the Min.Sum algorithm described above for a fabric as shown in FIG. 1, where p=1. The striper includes a queue counter array 810, containing all of the queue counts for the particular class c. That is, it contains a queue counter for each route from the subject input module through any intermediate module to any output module. More particularly, for a fabric having m intermediate stage modules and r output modules, the queue counter array 810 contains the following queue counters:

$$q(1,1,c), \ldots, q(m,1,c), \ldots, \ldots, q(1,r,c), \ldots, q(m,r,c).$$

The queue counter values are provided to combinational Min.Sum circuitry 812, which also receives a vector OM(1 . . . r) indicating which of the r output modules are destined to receive the current frame. If the current frame is a unicast frame, then only one bit of the vector OM(1 . . . r) is turned on. If the current frame is a multicast frame, then the bit of the vector OM(1 . . . r) corresponding to each output module containing a destination output port is turned on. For the unicast frame, a destination output module is simply an arithmetic function of the output port number as indicated in the header of the frame. For a multicast frame, the multicast group number from the frame header is provided to the multicast tree memory to read out the OM(1 . . . r) vector.

The Min.Sum circuitry 812 determines, in accordance with the sum minimization function given above, through which intermediate module i the current frame is to be sent. The chosen intermediate module number i is also provided back to the queue counter array 810 through a register 814, as is the vector OM(1 . . . r), to indicate which of the queue counters need to be increased to account for the transmission. The number of bytes in the frame is also provided to the queue counter array 810 via another register 816. Thus on a clock cycle after the Min.Sum circuitry 812 determines the intermediate module i, and in conjunction with the transmission of the current frame, the queue counter array 810 increases each of the counters q(i, a(G), c), q(i, b(G), c), . . . , and q(i, k(G), c), by the number of bytes in the frame, where a(G), b(G), . . . , and k(G) are the output modules containing the output ports in the multicast group G of the current frame. For a unicast frame, only one bit in the vector OM(1 . . . r) will be active, so only one of the queue counters will be increased.

More generally, to accommodate fabrics having p>1 data links between modules internally to the fabric, let the different data links in a path be numbered d=0 . . . (p−1), and let the routes be numbered with the granularity of a data link. Then the queue counter array 810 contains the following queue counters:

q(1,1,c), . . . , q(mp,1,c), . . . , . . . , q(1,r,c), . . . , q(mp,r,c), the Min.Sum circuitry 812 determines, in accordance with the sum minimization function given above, both through which intermediate module i the current frame is to be sent and which data link d to use to that module. The chosen route is therefore numbered 1+p(i−1)+d. The chosen route number is also provided back to the queue counter array 810 through a register 814, as is the vector OM(1 . . . r), to indicate which of the queue counters need to be increased to account for the transmission. Thus on a clock cycle after the Min.Sum circuitry 812 determines the route number, and in conjunction with the transmission of the current frame, the queue counter array 810 increases each of the counters is q([1+p(i−1)+d], a(G), c), q([1+p(i−1)+d], b(G), c), . . . , and q([1+p(i−1)+d], k(G), c); by the number of bytes in the frame, where a(G), b(G), . . . , and k(G) are the output modules containing the output ports in the multicast group G of the current frame. Again, for a unicast frame, only one bit in the vector OM(1 . . . r) will be active, so only one of the queue counters will be increased.

If the striper in a particular input module only incremented its queue counters, the queue counters would eventually overflow. There are a number of ways to prevent or accommodate this, some of which are based on the observation that the Min.Sum algorithm depends only on relative count values, not absolute count values. In particular, as mentioned, the Min.Sum algorithm compares the number of data bytes that a subject input module has sent via intermediate module i with a destination of output module j, relative to the number of data bytes that the subject input module has sent via any other route to the output stage.

Thus in one embodiment, the input module avoids queue counter overflow by comparing each of its m queue counters corresponding to a particular output module with a predetermined quantum of bytes, called an overflow prevention quantum. The comparators are shown as comparator blocks 820-1, . . . , 820-r in FIG. 8. Whenever all m of the counters corresponding to a particular output module exceed the overflow prevention quantum, the quantum is subtracted from each of the counters. In particular, for each output module j, whenever all q(i, j, c)>=Quantum, i=1, . . . , m, the Quantum is subtracted from q(i, j, c), i=1, . . . , m.

The overflow prevention quantum can be chosen depending on the maximum sustainable throughput of the switch and the peak throughput of the switch. If the switch can sustainable transport up to X bytes per clock cycle, then the quantum, Q, should be at least large enough so that the counters can be reduced quickly enough to more than keep up with that maximum data rate. If there are mp counters, then mp times the Quantum should be larger than X (Q>=X/mp). For example, if the switch can transport up to 64 bytes per clock cycle, and mp=8, then the Quantum should be at least 64/8=8. But as mentioned previously, the striper handles packet descriptors, not the packets themselves, and a descriptor of a maximum size packet can be moved as fast as a descriptor of a minimum size packet. Thus although the switch might be able to sustain a data rate of only X bytes per clock, the peak throughput over short time periods can be as large as the maximum packet size in a single clock. It is therefore desirable that the quantum be chosen to be much larger than X/mp. In the embodiment of FIG. 8, in which the quantum is 64, X is only 64 but the maximum packet size is approximately 2148 bytes.

In an alternative embodiment, each input module maintains not only the queue counters, but also a bank of sum counters $S_j$, j=1 . . . r (one for each output module). Each sum counter $S_j$ contains the sum of all the queue counts corresponding to output module j. Then if a particular frame destined for an output module j is striped to intermediate stage module i, and $S_j$ is less than a threshold, then the striper increases q(i, j, c) by the byte length of the frame. But if $S_j$ is greater than the threshold, then instead of increasing q(i, j, c), the striper decreases the queue counts for the routes to output module j through all other intermediate stage modules. That is, it decreases each of q(1, j, c), . . . , q(i−1, j, c), q(i+1, j, c), . . . , q(m, j, c) by the byte length of the frame. (For multicast frames destined for multiple output modules j, the striper increases or decreases the queue counts separately in dependence on each sum count $S_j$.) This technique ensures that the queue counts will nearly always remain within a certain bound around the threshold value. In the event that a queue count does increase to the point of overflow, the counter can be clamped at the maximum count to prevent wrap-around.

It will be appreciated that other techniques can be used to avoid or accommodate queue counter overflow, whether or not they take advantage of the relative nature of the Min.Sum algorithm.

As mentioned, the diagram of FIG. 8 is only a functional block diagram. A particular implementation might require specialized design techniques, all within the skill of an ordinary designer. In one embodiment, for example, in order to accommodate extremely fast data rates, the functions of the striper of FIG. 8 are pipelined. In another embodiment, the data rate might be too fast to allow the queue counters to be updated at the same rate at which data packets are striped and transmitted. For example, the queue counters might be updated (increased by the byte lengths of transmitted packets and/or decreased by the overflow prevention quantum) only in conjunction with every second packet transmitted (or in general, in conjunction with every N'th packet transmitted). In either of these embodiments, it will be appreciated that sometimes the Min.Sum logic 812 will select an output port for a particular data segment based on queue counts that are not entirely current. In this sense the queue counts might only approximately measure the impact on channel loading up to the point in time of such striping decisions. (As used herein, approximation includes exactness as a special case. That is, a formula that produces an exact result is considered to be within the group of formulas that "approximate" the result.)

Nevertheless, such an embodiment can still be said to base its striping decision on the relative channel loading of each route from the input module to an output module due to data that originated from the input module during some particular prior time period. The period over which the counts are current typically begins, as previously mentioned, either at a power-on reset or some other reset event, and ends (for the purposes of a given striping decision) as of the most recent packet whose transmission has been reflected in the queue counts.

Figure 9:
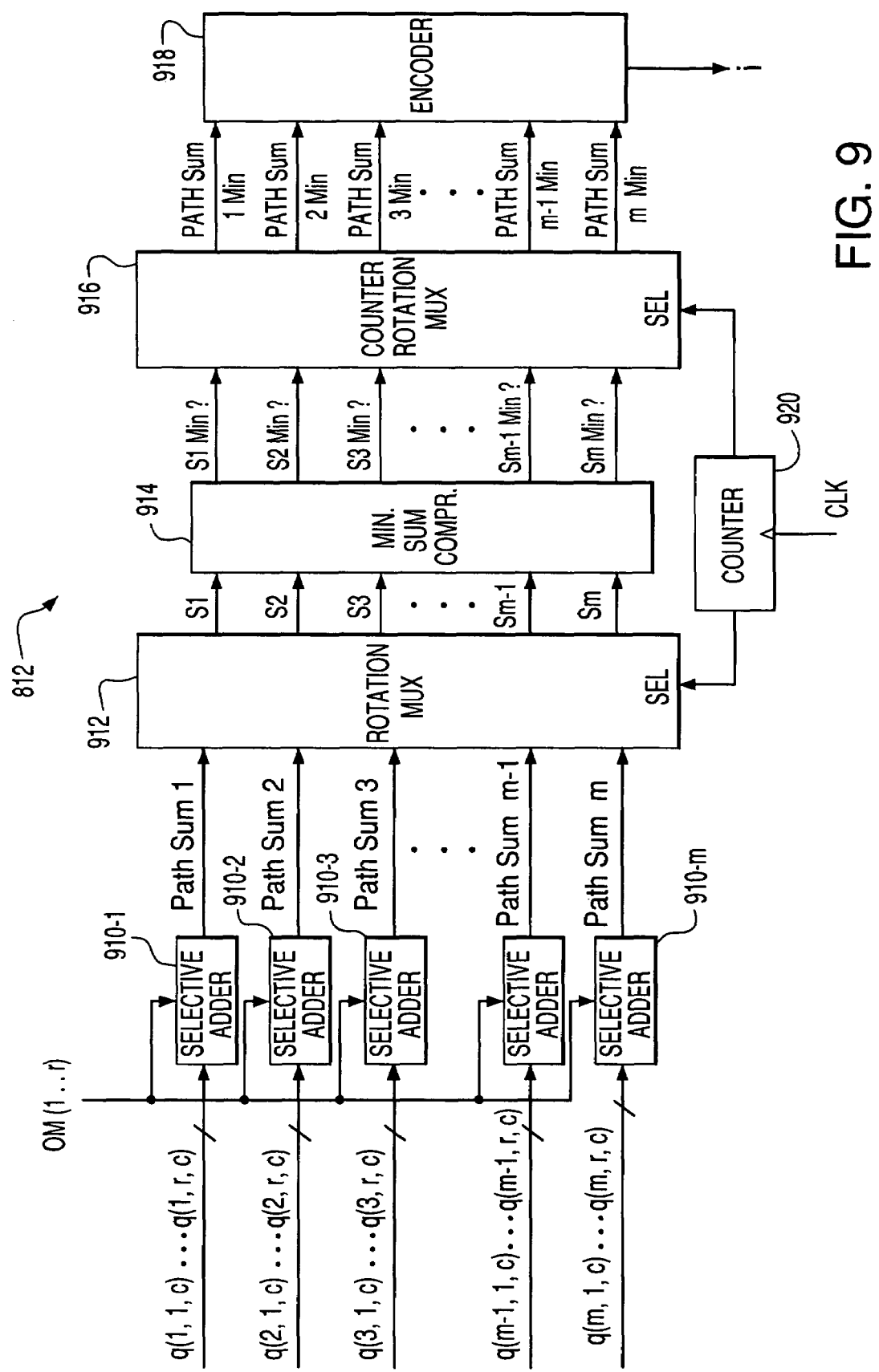
FIG. 9 is a functional block diagram of the Min.Sum logic in the striper of FIG. 8.

FIG. 9 is a functional block diagram of the Min.Sum logic 812 in the striper of FIG. 8. It comprises a plurality of m selective adders 910-1 through 910-*m* (representatively 910-*i*), each of which forms one of the sums of the Min.Sum algorithm that are to be compared for minimum. In particular, selective adder 910-*i* receives the count values in q(i, 1, c), . . . , q(i, r, c). Each selective adder also receives the output module selection vector OM(1 . . . r), indicating which of the r output modules are destined to receive the current data packet. Each selective adder 910-*i* sums only q(i,a(G),c), q(i,b(G),c), . . . , q(i,k(G),c), where a(G), b(G), . . . , and k(G) are the data packet destination output modules as indicated in OM(1 . . . r).

The path sum outputs of the selective adders 910 are provided to a rotation multiplexer 912, the purpose of which is explained hereinafter. The path sums are rotated according to a SELect input, and provided as sums S1, . . . , Sm to a Min.Sum comparator 914. The Min.Sum comparator 914 identifies one of the sums S1, . . . , Sm that have minimum value, and asserts only one of its output bits "S1 Min?", . . . , "Sm Min?" to indicate the selected minimum path. The bits "S1 Min?", . . . , "Sm Min?" are then provided to a counter-rotation multiplexer 916, for reasons explained hereinafter, which outputs a final vector "Path Sum 1 Min", . . . , "Path Sum m Min" having one bit asserted to indicate the selected minimum path i. This vector is provided to a binary encoder 918 which outputs the binary number i of the selected minimum path.

Figure 10:
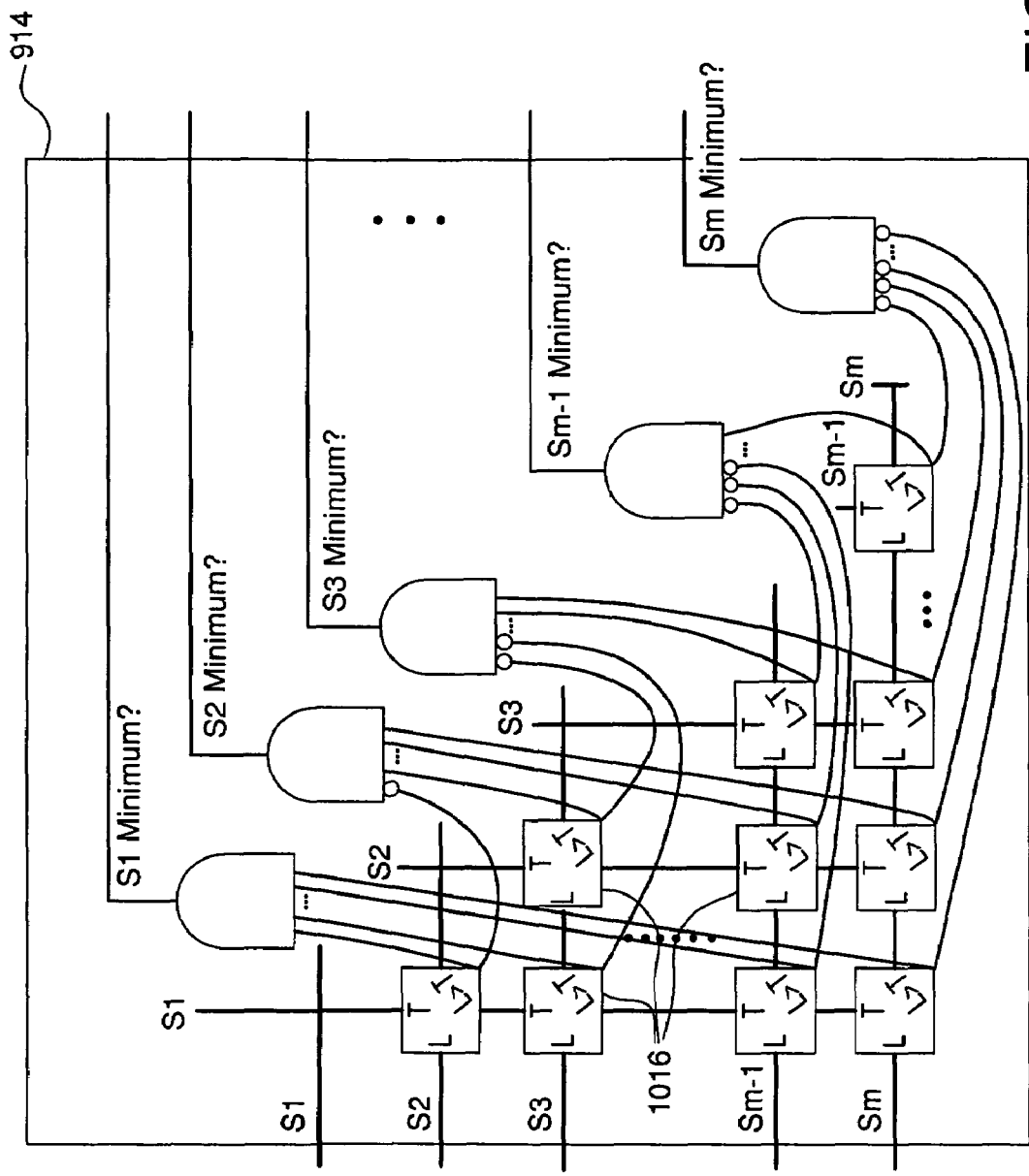
FIG. 10 is a functional block diagram of Min.Sum comparator of FIG. 9.

FIG. 10 is a functional block diagram of Min.Sum comparator 914 (FIG. 9). It includes an array of binary comparators 1016, one for each of the possible pairwise comparisons in the set of numbers input as sums S1 through Sm. This is shown in FIG. 10 by an array where numbers S1 through Sm enter along lines from left and top, and at each line intersection, a binary comparator 1016 determines whether the left number is larger than the top number. The results of m−1 of these pairwise comparisons (comparisons of S1 with each of S2 through Sm) are ANDed together to produce an "S1 Minimum?" signal indicating whether S1 is the minimum value. Another set of m−1 comparison results (comparisons of S2 with each of S1 through Sm except S2) is ANDed together (the comparison result of S1 with S2 being inverted before ANDing) to produce an "S2 Minimum?" signal indicating whether S2 is the minimum, and so on.

It can be seen that ties in the logic of FIG. 10 are hardwired to favor the higher indexed numbers. For example, if all the sums S1 through Sm are equal, only the "Sm Minimum?" signal becomes asserted. To avoid persistent bias, therefore, each of the m path sums being compared in the Min.Sum logic are multiplexed into a different Si input of the Min. Sum comparator 910 on every clock cycle. For example, in one clock cycle path sum 1 is connected to S1, path sum 2 connected to S2, etc., and in the next clock cycle, path sum 1 is connected to S2, path sum 2 connected to S3, etc. . . . This is accomplished by rotation multiplexer 912 in FIG. 9 and counter 920 connected to the SELect input of rotation multiplexer 912. Counter-rotation multiplexer 916 provides the opposite rotation to thereby return the minimum sum indications to their original order. Since the rotations inserted by the multiplexers 912 and 916 change on every clock cycle, the benefit of the comparator's tie-breaker bias is effectively spread out among all the paths.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for routing segments of data belonging to a class of a set of one or more classes, from a first input module in an input stage to a plurality of output modules in an output stage, via a plurality of intermediate stage modules, said first input module having a data path to each of said intermediate stage modules and each of said intermediate stage modules having a data path to at least one of said output modules, an intermediate stage module including a multicast replicator for forwarding a data segment received from an input module to more than one of said output modules, the method comprising the steps of said first input module:
   (a) determining, in dependence upon a measure of relative channel loading of routes from said first input module to said output stage via said data paths, due to data of said class that originated from said first input module during a given prior time period, a given intermediate stage module of said intermediate stage modules through which to send a given next data segment of said class to be sent by said first input module; and
   (b) sending said given next data segment on the data path to said given intermediate stage module, wherein:
      the data originating from said first input module during said given prior time period includes a prior data segment of said class replicated by said multicast replicator for forwarding to more than one of said output modules, and
      the channel loading due to said prior data segment is reflected in said measure of relative channel loading of each of the routes taken by said prior data segment from said first input module to modules in said output stage.

2. A method according to claim 1, wherein said class is a class of service.

3. A method according to claim 1, further comprising an additional method for routing segments of data not belonging to said class.

4. A method according to claim 1, further for routing segments of data belonging to said class from a second input module to said output stage, via said plurality of intermediate stage modules, said second input module having a data path to each of said intermediate stage modules, further comprising the step of said second input module:
  in dependence upon the measure of relative channel loading of routes from said second input module to said output stage via said data paths due to data of said class that originated from said second input module during a particular prior time period, and regardless of the measure of relative channel loading of the routes from said first input module to an output module due to data of said class that originated from said first input module during said particular prior time period, determining a particular one of said intermediate stage module through which to route a particular next data segment of said class to be sent by said second input module; and
  sending said particular next data segment to said particular intermediate stage module.

5. A method according to claim 1, wherein the measure of relative channel loading of a particular route is given by the relative number of data segments sent along the particular route.

6. A method according to claim 1, wherein the measure of relative channel loading of a particular route is given by the relative number of bytes of data of said class, originating from said first input module, that were sent along the particular route.

7. A method according to claim 1, wherein each of said routes from said first input module to said output stage has a respective channel capacity,
  and wherein the measure of channel loading of said routes is normalized for said respective channel capacities.

8. A method according to claim 1, further comprising the step of maintaining counts indicating at least the relative number of bytes of data of said class, originating from said first input module, that were sent along each of said routes from said first input module to said output stage during said given prior time period,
  and wherein said step of determining a given intermediate stage module through which to send a given next data segment comprises the step of determining said given intermediate stage module in dependence upon said counts.

9. A method according to claim 8, wherein said step of maintaining counts comprises the step of updating said counts in conjunction with each data segment of said class, originating from said first input module, that was sent along each of said routes from said first input module to said output stage during said given prior time period.

10. A method according to claim 8, wherein said step of maintaining counts comprises the step of updating said counts in conjunction with transmission of said prior data segment from said first input module, to reflect channel loading of each of the routes taken by said prior data segment to modules in said output stage.

11. A method according to claim 1, wherein said given prior time period is an immediately prior time period.

12. A method according to claim 1, wherein said step of determining a given intermediate stage module comprises the step of determining said given intermediate stage module in dependence upon the measure of relative channel loading of only the routes from said first input module to each output module to which said given next data segment is destined.

13. A method according to claim 12, wherein said given next data segment is destined for each of a plurality of said output modules.

14. A method according to claim 1, wherein said first input module has a plurality of data links to one of said intermediate stage modules, each of said data links defining a separate route.

15. A method according to claim 1, wherein said first input module has a plurality of data links to one of said intermediate stage modules, all of said data links being part of a single route.

16. A method according to claim 1, wherein one of said intermediate stage modules comprises a plurality of input sub-modules in an input sub-stage, a plurality of output sub-modules in an output sub-stage, and a plurality of intermediate sub-modules in an intermediate sub-stage, each of the input sub-modules having a data path to each of said intermediate sub-modules and each of said intermediate sub-modules having a data path to each of said output sub-modules.

17. A method according to claim 1, wherein said step of determining a given intermediate stage module of said intermediate stage modules comprises the step of selecting an i'th one of said intermediate stage modules, where i minimizes $$q(i,j=a(G),c)+q(i,j=b(G),c)+\ldots+q(i,j=k(G),c),$$

where:
  $q(i, j, c)$ indicates the number of bytes of data of said class sent, during said given prior time period, from said first input module to each j'th one of said output modules via each i'th one of said intermediate stage modules, normalized by a respective channel capacity from said first input module to each j'th one of said output modules via each i'th one of said intermediate stage modules,
  G is a multicast group of at least one output module to which the given next data segment is destined,
  $a(G), b(G), \ldots$, and $k(G)$ are the output module(s) in multicast group G, and c is the class of the given next data segment.

18. A method according to claim 17, further comprising, in conjunction with the sending of a particular data segment of a class cc from said first input module to the output ports in a multicast group GG of more than one output port, via an ii'th one of said intermediate stage modules,
  the step of increasing the number of bytes of data indicated by each of $q(ii, jj=a(GG), cc), q(ii, jj=b(GG), cc), \ldots,$ and $q(ii, jj=k(GG), cc)$, relative to all other $q(ii, jj, cc)$, by the number of bytes in the given next data segment, normalized by the respective channel capacity from said first input module to each j'th one of said output modules via each i'th one of said intermediate stage modules,
  where $a(GG), b(GG), \ldots$, and $k(GG)$ are the output ports in multicast group GG.

19. A method according to claim 17, further comprising, in conjunction with the sending of a particular data segment of a class cc from said first input module to the output ports in a multicast group GG of more than one output port, via an ii'th one of said intermediate stage modules,
  the step of increasing the number of bytes of data indicated by each of $q(ii, jj=a(GG), cc), q(ii, jj=b(GG), cc), \ldots,$ and $q(ii, jj=k(GG), cc)$, relative to all other $q(ii, jj, cc)$, by the number of bytes in the given next data segment times respectively $L_{max}/L(ii, jj=a(GG))$, $L_{max}/L(ii, jj=b(GG)), \ldots, L_{max}/L(ii, jj=k(GG))$, where a(GG), b(GG), ..., and k(GG) are the output ports in multicast group GG, where L(i,j) is a data rate from said first input module, via intermediate module i, to output module j, and where $L_{max}$ is the maximum of all the L(i,j).

20. A method according to claim 19, wherein L(ii, jj=a(GG)), L(ii, jj=b(GG)), ..., and L(ii, jj=k(GG)) are all equal to $L_{max}$, and wherein the step of increasing the number of bytes of data indicated by each of q(ii, jj=a(GG), cc), q(ii, jj=b(GG), cc), ..., and q(ii, jj=k(GG), cc), relative to all other q(ii, jj, cc), by the number of bytes in the given next data segment.

21. A method according to claim 1, wherein said step of determining a given intermediate stage module of said intermediate stage modules comprises the step of selecting an i'th one of said intermediate stage modules, where i minimizes $$q(i,j=a(G),c)/L(i,j=a(G))+q(i,j=b(G),c)/L(i,j=b(G))+\ldots+q(i,j=k(G),c)/L(i,j=k(G)),$$

where:
- q(i, j, c) indicates the number of bytes of data of said class sent, during said given prior time period, from said first input module to each j'th one of said output modules via each i'th one of said intermediate stage modules,
- L(i, j) indicates a data rate from said first input module to each j'th one of said output modules via each i'th one of said intermediate stage modules,
- G is a multicast group of at least one output module to which the given next data segment is destined,
- a(G), b(G), ..., and k(G) are the output module(s) in multicast group G, and c is the class of the given next data segment.

22. A method according to claim 1, wherein said first input module is disposed on a single integrated circuit chip with one of said output modules.

23. An input module for use in a switch fabric that contains an input stage including said input module, plurality of output modules in an output stage, and a plurality of intermediate stage modules, said input module having a data path to each of said intermediate stage modules and each of said intermediate stage modules having a data path to at least one of said output modules, at least one of said intermediate stage modules including a multicast replicator for forwarding a data segment received from an input module to more than one of said output modules, for routing segments of data belonging to a class of a set of one or more classes from said input module to said output modules via said intermediate stage modules, the input module comprising:

determining logic that, in dependence upon a measure of relative channel loading of routes from said input module to said output stage via said data paths, due to data of said class that originated from said input module during a given prior time period, determines a given intermediate stage module of said intermediate stage modules through which to send a given next data segment of said class to be sent by said input module; and sending logic that sends said given next data segment on the data path to said given intermediate stage module, wherein for a prior data segment sent by said sending logic and destined for more than one of said output modules, the channel loading due to said prior data segment is reflected in said measure of relative channel loading of each of the routes taken by said prior data segment from said input module to modules in said output stage.

24. An input module according to claim 23, wherein said class is a class of service.

25. An input module according to claim 23, further comprising additional logic for routing segments of data not belonging to said class.

26. An input module according to claim 23, wherein said input stage further includes a second input module having a data path to each of said intermediate stage modules.

27. An input module according to claim 23, wherein the measure of relative channel loading of a particular route is given by the relative number of data segments for which the intermediate stage module of the particular route was determined by said determining logic.

28. An input module according to claim 23, wherein the measure of relative channel loading of a particular route is given by the relative number of bytes for which the intermediate stage module of the particular route was determined by said determining logic.

29. An input module according to claim 23, wherein each of said routes from said input module to said output stage has a respective channel capacity, and wherein the measure of channel loading of said routes is normalized for said respective channel capacities.

30. An input module according to claim 23, further comprising history logic which maintains counts indicating at least the relative number of bytes of data of said class, originating from said input module, that were sent along each of said routes from said input module to said output stage during said given prior time period, and wherein said determining logic determines said given intermediate stage module in dependence upon said counts.

31. An input module according to claim 30, wherein said history logic updates said counts in conjunction with each data segment of said class, originating from said input module, for which a route was determined by said determining logic during said given prior time period.

32. An input module according to claim 30, wherein said history logic updates said counts in conjunction with each prior data segment of said class, originating from said input module and destined for more than one of said output modules, to reflect channel loading of each of the routes taken by said prior data segment to modules in said output stage.

33. An input module according to claim 23, wherein said given prior time period is an immediately prior time period.

34. An input module according to claim 23, wherein said determining logic determines said given intermediate stage module in dependence upon the measure of relative channel loading of only the routes from said input module to each output module to which said given next data segment is destined.

35. An input module according to claim 23, wherein said determining logic comprises logic which selects an i'th one of said intermediate stage modules, where i minimizes $$q(i,j=a(G),c)+q(i,j=b(G),c)+\ldots+q(i,j=k(G),c),$$

where:
- q(i, j, c) indicates the number of bytes of data of said class sent, during said given prior time period, from said input module to each j'th one of said output modules via each i'th one of said intermediate stage modules, normalized by a respective channel capacity from said input module to each j'th one of said output modules via each i'th one of said intermediate stage modules,
- G is a multicast group of at least one output module to which the given next data segment is destined, a(G), b(G), . . . , and k(G) are the output module(s) in multicast group G, and c is the class of the given next data segment.

36. An input module according to claim 35, further comprising history logic which, in conjunction with the sending of a particular data segment of a class cc from said input module to the output ports in a multicast group GG of more than one output port, via an ii'th one of said intermediate stage modules, increases the number of bytes of data indicated by each of q(ii, jj=a(GG), cc), q(ii, jj=b(GG), cc), . . . , and q(ii, jj=k(GG), cc), relative to all other q(ii, jj, cc), by the number of bytes in the given next data segment, normalized by the respective channel capacity from said input module to each j'th one of said output modules via each i'th one of said intermediate stage modules, where a(GG), b(GG), . . . , and k(GG) are the output ports in multicast group GG.

37. An input module according to claim 35, further comprising history logic which, in conjunction with the sending of a particular data segment of a class cc from said input module to the output ports in a multicast group GG of more than one output port, via an ii'th one of said intermediate stage modules, increases the number of bytes of data indicated by each of q(ii, jj=a(GG), cc), q(ii, jj=b(GG), cc), . . . , and q(ii, jj=k(GG), cc), relative to all other q(ii, jj, cc), by the number of bytes in the given next data segment times respectively $L_{max}/L(ii, jj=a(GG))$, $L_{max}/L(ii, jj=b(GG))$, . . . , $L_{max}/L(ii, jj=k(GG))$, where a(GG), b(GG), . . . , and k(GG) are the output ports in multicast group GG, where L(i,j) is a data rate from said input module, via intermediate module i, to output module j, and where $L_{max}$ is the maximum of all the L(i,j).

38. An input module according to claim 23, wherein said determining logic comprises logic which selects an i'th one of said intermediate stage modules, where i minimizes $$q(i,j=a(G),c)/L(i,j=a(G))+q(i,j=b(G),c)/L(i,j=b(G))+\ldots+q(i,j=k(G),c)/L(i,j=k(G)),$$

where:

q(i, j, c) indicates the number of bytes of data of said class sent, during said given prior time period, from said input module to each j'th one of said output modules via each i'th one of said intermediate stage modules, L(i, j) indicates a data rate from said input module to each j'th one of said output modules via each i'th one of said intermediate stage modules, G is a multicast group of at least one output module to which the given next data segment is destined, a(G), b(G), . . . , and k(G) are the output module(s) in multicast group G, and c is the class of the given next data segment.

39. An input module according to claim 23, comprising an integrated circuit chip on which is disposed both said input module and one of said output modules.

40. A data switch including an input module according to claim 23.

41. A method for routing segments of data belonging to a class of a set of one or more classes, from a first input module to a plurality of output modules via a plurality of intermediate stage modules in accordance with a striping algorithm, said first input module having a data path to each of said intermediate stage modules and each of said intermediate stage modules having a data path to each of said output modules, an intermediate stage module including a multicast replicator for outputting a data segment received from an input module to more than one of said output modules, the method in accordance with the striping algorithm comprising the step of said first input module sending each subject data segment of a plurality of subject data segments via intermediate stage module i, where i minimizes $$q(i,j=a(G),c)+q(i,j=b(G),c)+\ldots+q(i,j=k(G),c),$$

where:

q(i, j, c) indicates the number of bytes of data of each class c sent, during a particular prior time period, from said first input module to each j'th one of said output modules via each i'th one of said intermediate stage modules, G is a multicast group of at least one output module to which the subject data segment is destined, a(G), b(G), . . . , and k(G) are the output module(s) in multicast group G, and c is the class of the subject data segment, and wherein the data sent from said first input module during said particular prior time period includes at least one data segment replicated by said multicast replicator for output to more than one of said output modules.

42. A method according to claim 41, wherein all of said data segments are data blocks of constant length.

43. A method according to claim 41, wherein not all data segments of class c sent during said particular prior time period from said first stage module to output module a(G) are of constant length.

44. A method according to claim 41, wherein one of said subject data segments is destined for more than one of said output modules.

45. A method according to claim 41, wherein each of said intermediate stage modules includes a multicast replicator for outputting data segments received from said first input module to more than one output module in said plurality of output modules.

46. A method according to claim 41, for use in routing segments of data from a plurality of input modules to said plurality of output modules via said plurality of intermediate stage modules, said plurality of input modules including said first input module, and each input module in said plurality of input modules having a data path to each of said intermediate stage modules.

47. A method according to claim 46, wherein each input module in said plurality of input modules is disposed on a single integrated circuit chip with a respective one of said output modules.

48. A method according to claim 41, further for routing segments of data belonging to a class in said set of one or more classes, from a second input module to said plurality of output modules via said plurality of intermediate stage modules, said second input module having a data path to each of said intermediate stage modules, comprising the step of said second input module sending each given data segment via intermediate stage module $i_2$, where $i_2$ minimizes $$q_2(i_2,j_2=a(G_2),c_2)+q_2(i_2,j_2=b(G_2),c_2)+\ldots+q_2(i_2,j_2=k(G_2),c_2);$$

where:

$q_2(i_2, j_2, c_2)$ indicates the number of bytes of data of each class $c_2$ sent, during a given prior time period, from said second input module to each $j_2$'th one of said output modules via each $i_2$'th one of said intermediate stage modules, $G_2$ is a multicast group of at least one output module to which the given data segment is destined, $a(G_2), b(G_2), \ldots,$ and $k(G_2)$ are the output module(s) in multicast group $G_2$, and $c_2$ is the class of the given data segment, and wherein the data sent from said second input module during said given prior time period includes at least one data segment replicated by said multicast replicator for output to more than one of said output modules.

49. A method according to claim 41, wherein said set of one or more classes includes more than one class.

50. A method according to claim 49, wherein said classes in said set of classes are classes of service.

51. A method according to claim 49, wherein said set of one or more classes includes a time-sensitive class of data, a bandwidth provisioned class of data and a best-efforts class of data.

52. A method according to claim 49, for use with a plurality of queues of incoming data segments, each of said queues receiving data of a respective one of said classes, further comprising the step of said input module selecting said each subject data segment from among said queues according to a predetermined priority order of said classes.

53. A method according to claim 41, further comprising, in conjunction with the sending of a given one of said subject data segments in said step of sending, the step of increasing the number of bytes of data indicated by each of said q(ii, jj=a(GG), cc), q(ii, jj=b(GG), cc), . . . , and q(ii, jj=k(GG), cc), relative to all other q(ii, jj, cc), by the number of bytes in the given data segment, where ii is the intermediate stage module through which the given data segment is sent, GG is the multicast group of output modules to which the given data segment is destined, a(GG), b(GG), . . . , and k(GG) are the output modules in multicast group GG, and cc is the class of said given data segment.

54. A method according to claim 53, wherein said step of increasing the number of bytes of data indicated by each of said q(ii, jj=a(GG), cc), q(ii, jj=b(GG), cc), . . . , and q(ii, jj=k(GG), cc), relative to all other q(ii, jj, cc), by the number of bytes in the given data segment, comprises the step of increasing the number of bytes of data indicated by each of said q(ii, jj=a(GG), cc), q(ii, jj=b(GG), cc), . . . , and q(ii, jj=k(GG), cc), by the number of bytes in the given data segment.

55. A method according to claim 53, wherein all of the data segments sent in said step of sending are data blocks of constant length, and wherein said step of increasing the number of bytes of data indicated by each of said q(ii, jj=a(GG), cc), q(ii, jj=b(GG), cc), . . . , and q(ii, jj=k(GG), cc), relative to all other q(ii, jj, cc), comprises the step of incrementing each of said q(ii, jj=a(GG), cc), q(ii, jj=b(GG), cc), . . . , and q(ii, jj=k(GG), cc) by 1 relative to all other q(ii, jj, cc).

56. A method according to claim 41, further comprising, in conjunction with the sending of each given one of said subject data segments in said step of sending, the step of increasing the number of bytes of data indicated by each of said q(ii, jj=a(GG), cc), q(ii, jj=b(GG), cc), . . . , and q(ii, jj=k(GG), cc), relative to all other q(ii, jj, cc), by the number of bytes in the given data segment, where ii is the intermediate stage module through which the given data segment is sent, GG is the multicast group of output modules to which the given data segment is destined, a(GG), b(GG), . . . , and k(GG) are the output modules in multicast group GG, and cc is the class of said given data segment.

57. A method according to claim 41, wherein said particular prior time period is an immediately prior time period.

58. A method according to claim 41, wherein the data path from said first input module to an ii'th one of said intermediate stage modules includes a first plurality of data links, wherein said step of sending each subject data segment via intermediate module i comprises, for a given one of said subject data segments to be sent via intermediate stage module ii, the step of selecting a given one of said data links on which to send said given data segment.

59. A method according to claim 41, wherein the data path from said first input module to an ii'th one of said intermediate stage modules includes a first plurality of data links, wherein the data path from said ii'th intermediate stage module to a destination output module to which said given data segment is destined includes a second plurality of data links each corresponding to a respective data link in said first plurality of data links, and wherein said step of sending each subject data segment via intermediate module i comprises, for each given one of said subject data segments to be sent via intermediate stage module ii, the step of selecting a respective given one of said data links on which to send said given data segment, further comprising the step of said ii'th intermediate stage module forwarding said given data segment toward said destination output module on the data link in said second plurality of data links that corresponds to the given data link in said first plurality of data links.

60. A method according to claim 41, wherein one of said intermediate stage modules comprises a plurality of input sub-modules in an input sub-stage, a plurality of output sub-modules in an output sub-stage, and a plurality of intermediate sub-modules in an intermediate sub-stage, each of the input sub-modules having a data path to each of said intermediate sub-modules and each of said intermediate sub-modules having a data path to each of said output sub-modules.

61. A method according to claim 41, further for routing data segments from said first input module to a further stage downstream of said plurality of output modules, further comprising the step of routing data segments originating from said first input module and reaching one of said output modules, to a module in said further stage.

62. Striping apparatus for use in routing segments of data belonging to a class of a set of one or more classes, from a first input module to a plurality of output modules via a plurality of intermediate stage modules, including data segments destined for more than one of said output modules, said first input module having a data path to each of said intermediate stage modules and each of said intermediate stage modules having a data path to each of said output modules, at least one of said intermediate stage modules including a multicast replicator for outputting a data segment received from an input module to more than one of said output modules, the striping apparatus sending each subject data segment of a plurality of subject data segments via intermediate stage module i, where i minimizes $$q(i,j=a(G),c)+q(i,j=b(G),c)+ \ldots + q(i,j=k(G),c),$$

where:

q(i, j, c) indicates the number of bytes of data of each class c sent, during a particular prior time period, from said first input module to each j'th one of said output modules via each i'th one of said intermediate stage modules, G is a multicast group of at least one output module to which the subject data segment is destined, a(G), b(G), ..., and k(G) are the output module(s) in multicast group G, and c is the class of the subject data segment.

63. Apparatus according to claim 62, wherein all of said data segments are data blocks of constant length.

64. Apparatus according to claim 62, wherein not all data segments of class c sent during said particular prior time period from said first stage module to output module a(G) are of constant length.

65. Apparatus according to claim 62, for use in routing segments of data from a plurality of input modules to said plurality of output modules via said plurality of intermediate stage modules, said plurality of input modules including said first input module, and each input module in said plurality of input modules having a data path to each of said intermediate stage modules.

66. Apparatus according to claim 65, comprising an integrated circuit chip on which is disposed both said first input module and one of said output modules.

67. Apparatus according to claim 62, further for routing segments of data belonging to a class in said set of one or more classes, from a second input module to said plurality of output modules via said plurality of intermediate stage modules, said second input module having a data path to each of said intermediate stage modules, the striping apparatus sending each given data segment from said second input module via intermediate stage module $i_2$, where $i_2$ minimizes $$q_2(i_2,j_2=a(G_2),c_2)+q_2(i_2,j_2=b(G_2),c_2)+\ldots+q_2(i_2,j_2=k(G_2),c_2);$$

where:

$q_2(i_2, j_2, c_2)$ indicates the number of bytes of data of each class $c_2$ sent, during a given prior time period, from said second input module to each $j_2$'th one of said output modules via each $i_2$'th one of said intermediate stage modules, $G_2$ is a multicast group of at least one output module to which the given data segment is destined, $a(G_2), b(G_2), \ldots,$ and $k(G_2)$ are the output module(s) in multicast group $G_2$, and $c_2$ is the class of the given data segment.

68. Apparatus according to claim 62, further comprising history logic which, in conjunction with selection of a route by said striping apparatus for a given one of said subject data segments, increases the number of bytes of data indicated by each of said q(ii, jj=a(GG), cc), q(ii, jj=b(GG), cc), ..., and q(ii, jj=k(GG), cc), relative to all other q(ii, jj, cc), by the number of bytes in the given data segment, where ii is the intermediate stage module through which the given data segment is sent, GG is the multicast group of output modules to which the given data segment is destined, a(GG), b(GG), ..., and k(GG) are the output modules in multicast group GG, and cc is the class of said given data segment.

69. Apparatus according to claim 68, wherein said history logic increases the number of bytes of data indicated by each of said q(ii, jj=a(GG), cc), q(ii, jj=b(GG), cc), and q(ii, jj=k(GG), cc), by the number of bytes in the given data segment.

70. Apparatus according to claim 62, further comprising history logic which, in conjunction with selection of a route by said striping apparatus for each given one of said subject data segments, increases the number of bytes of data indicated by each of said q(ii, jj=a(GG), cc), q(ii, jj=b(GG), cc), ..., and q(ii, jj=k(GG), cc), relative to all other q(ii, jj, cc), by the number of bytes in the given data segment, where ii is the intermediate stage module through which the given data segment is sent, GG is the multicast group of output modules to which the given data segment is destined, a(GG), b(GG), ..., and k(GG) are the output modules in multicast group GG, and cc is the class of said given data segment.

71. Apparatus according to claim 62, wherein said particular prior time period is an immediately prior time period.

72. Apparatus according to claim 62, wherein the data path from said first input module to an ii'th one of said intermediate stage modules includes a first plurality of data links, wherein said striping apparatus, for a given one of said subject data segments to be sent via intermediate stage module ii, selects a given one of said data links on which to send said given data segment.

73. Apparatus according to claim 62, wherein the data path from said first input module to an ii'th one of said intermediate stage modules includes a first plurality of data links, wherein the data path from said ii'th intermediate stage module to a destination output module to which said given data segment is destined includes a second plurality of data links each corresponding to a respective data link in said first plurality of data links, and wherein said striping apparatus, for each given one of said subject data segments to be sent via intermediate stage module ii, selects a respective given one of said data links on which to send said given data segment, and further comprising an intermediate stage striper which forwards said given data segment toward said destination output module on the data link in said second plurality of data links that corresponds to the given data link in said first plurality of data links.

74. A method for routing segments of data belonging to a class of a set of one or more classes, from a first input module to a plurality of output modules via a plurality of routes through an intermediate stage, said first input module having a plurality of output ports toward said intermediate stage and said intermediate stage including at least one multicast replicator for outputting a data segment received from an input module to more than one of said output modules, comprising the step of said first input module sending each subject data segment of a plurality of subject data segments via its output port i, where i minimizes $$q(i,j=a(G),c)+q(i,j=b(G),c)+\ldots+q(i,j=k(G),c),$$

where:

q(i, j, c) indicates the number of bytes of data of each class c sent, during a particular prior time period, from said first input module to each j'th one of said output modules via each i'th one of said output ports of said first input module, G is a multicast group of at least one output module to which the subject data segment is destined, a(G), b(G), ..., and k(G) are the output module(s) in multicast group G, and c is the class of the subject data segment, and wherein the data sent from said first input module during said particular prior time period includes at least one data segment replicated by said at least one multicast replicator for output to more than one of said output modules.

75. Striping apparatus for a fabric having a first input module connected to an intermediate stage connected to a plurality of output modules, the striping apparatus for use in routing segments of data belonging to a class of a set of one or more classes, from the first input module to the plurality of output modules via a plurality of routes through the intermediate stage, including data segments destined for more than one of said output modules, said first input module having a plurality of output ports toward said intermediate stage and said intermediate stage including at least one multicast replicator for outputting a data segment received from an input module to more than one of said output modules, the striping apparatus sending each subject data segment of a plurality of subject data segments via output port i of said first input module, where i minimizes $$q(i,j=a(G),c)+q(i,j=b(G),c)+\ldots+q(i,j=k(G),c),$$

where:
- q(i, j, c) indicates the number of bytes of data of each class c sent, during a particular prior time period, from said first input module to each j'th one of said output modules via each i'th one of said output ports of said first input module,
- G is a multicast group of at least one output module to which the subject data segment is destined,
- a(G), b(G), ..., and k(G) are the output module(s) in multicast group G, and
- c is the class of the subject data segment.

76. A method for forwarding segments of data belonging to a class of a set of one or more classes, from a first input module in an input stage to output modules in an output stage via a plurality of routes, comprising the steps of said first input module:
- queuing a plurality of data segments of said class in said first module, each of said data segments having a respective group of at least one destination output module;
- transmitting data segments from said plurality of data segments via said routes;
- receiving acknowledgments each indicating receipt by an output module of a number x of data segments that originated from said first input module;
- selecting a subject next data segment from among only those of said queued data segments whose group of destination output modules does not include any particular output module from which an acknowledgment has not yet been received by said first input module covering the y'th previously sent data segment of said class sent from said first input module and destined for said particular output module, y>x; and
- transmitting said subject next data segment via an i'th one of said routes, where i minimizes $$q(i,j=a(G),c)+q(i,j=b(G),c)+\ldots+q(i,j=k(G),c),$$

where:
- q(i, j, c) indicates the number of bytes of data of said class sent, during a given prior time period, from said first input module to each j'th one of said output modules via each i'th one of said routes,
- a(G), b(G), ..., and k(G) are the output module(s) to which said subject next data segment is destined, and
- c is the class of said subject next data segment.

77. A method according to claim 76, wherein said step of transmitting data segments from said plurality of data segments comprises the step of, for each particular data segment transmitted in said step of transmitting data segments from said plurality of data segments, transmitting said particular data segment via an ii'th one of said routes, where ii minimizes $$q(ii,jj=a(GG),c)+q(ii,jj=b(GG),c)+\ldots+q(ii,jj=k(GG),c),$$

where:
- q(ii, jj, c) indicates the number of bytes of data of said class sent, during a respective prior time period, from said first input module to each jj'th one of said output modules via each ii'th one of said routes, and
- a(GG), b(GG), ..., and k(GG) are the output module(s) to which said particular data segment is destined.

78. A method according to claim 76, wherein the data segments transmitted in said step of transmitting data segments from said plurality of data segments, prior to said step of selecting a subject next data segment, include at least one data segment destined for more than one of said output modules.

79. A method according to claim 76, wherein the data segments sent from said first input module during said given prior time period include at least one data segment destined for more than one of said output modules.

80. A method according to claim 79, wherein the data segments transmitted in said step of transmitting data segments from said plurality of data segments, prior to said step of selecting a subject next data segment, include at least one data segment destined for more than one of said output modules.

81. Switching apparatus comprising:
- a plurality of input modules and a plurality of output modules;
- a plurality of intermediate stage modules, each intermediate stage module including a multicast replicator for forwarding a data segment received from an input module to more than one of said output modules;
- data paths interconnecting each of said input modules with each of said intermediate stage modules and each of said intermediate stage modules with each of said output modules, said input modules transmitting data segments toward said output modules via said intermediate stage modules; and
- a striping mechanism which determines, for each subject one of said data segments, a respective one of said intermediate stage modules via which the subject data segment should be transmitted, wherein:
  - said striping mechanism is distributed across all of said input modules; and
  - said striping mechanism comprises a path select mechanism in each of said input modules, the path select mechanism in each given one of said input modules selecting intermediate stage modules for only those of said subject data segments being transmitted by said given input module, and without considering any history of path selections made by any others of said input modules.

82. Apparatus according to claim 81, wherein said switching apparatus is such that the data segments transmitted from said input modules need not be of fixed size.

83. Apparatus according to claim 82, wherein said switching apparatus further is such that the data segments transmitted from said input modules need not be of variable size.

84. Apparatus according to claim 81, wherein one of said subject data segments is destined for more than one of said output modules.

85. Apparatus according to claim 81, wherein the path select mechanism in each given one of said input modules selects intermediate stage modules for those of said subject data segments being transmitted by said given input module, in dependence upon a history of path selections made previously by the path select mechanism in the given input module.

86. Apparatus according to claim 85, wherein the path select mechanism in said given input module selects intermediate stage modules further in dependence upon a history of routes, taken by multicast data segments originating from said given input module, from intermediate stage modules to more than one output module.

87. Apparatus according to claim 81, wherein said striping mechanism comprises a path select mechanism in each of said input modules, the path select mechanism in each given one of said input modules comprising:
- a mechanism for maintaining a measure of relative channel loading of routes from said each given input module to output modules, due to data that originated from said each given input module during a given prior time period, said measure of relative channel loading reflecting relative channel loading of each of the routes taken by multicast data segments originating from said each given input module; and
- a path select mechanism which, in dependence upon said measure of relative channel loading, determines a given one of said intermediate stage modules through which to send at least a subset of next data segments to be sent by said each given input module.

88. Apparatus according to claim 81, wherein each input module in said plurality of input modules is disposed on a single integrated circuit chip with a respective one of said output modules.

89. A combination of first and second data switches connected either in series or in parallel in a data network, each of said data switches comprising:
- a plurality of input modules and a plurality of output modules;
- a plurality of intermediate stage modules, each intermediate stage module in each subject one of said data switches including a multicast replicator for forwarding a data segment received from an input module in said subject data switch to more than one of said output modules in said subject data switch;
- data paths interconnecting each of said input modules with each of the intermediate stage modules in the same data switch and each of said intermediate stage modules with each of said output modules in the same data switch, said input modules transmitting data segments toward the output modules in the same data switch via the intermediate stage modules in the same data switch; and
- a striping mechanism in each given one of said data switches, distributed across all of the input modules in the given data switch, which determines, for each data segment transmitted from an input module in the given data switch, a respective one of said intermediate stage modules in the given data switch via which the data segment should be transmitted,
- wherein all of the input modules in both said first and second data switches are identical in the logic they contain,
- and wherein the number of input modules contained in said second data switch differs from the number of input modules contained in said first data switch.

90. A combination according to claim 89, wherein all of the intermediate stage modules in both said first and second data switches are identical in the logic they contain, and wherein the number of intermediate stage modules contained in said second data switch differs from the number of intermediate stage modules contained in said first data switch.

91. A combination according to claim 89, wherein all of modules in both said first and second data switches are identical in the logic they contain.

92. A combination according to claim 89, wherein both said first and second data switches are non-blocking.

93. A combination according to claim 89, wherein said second data switch has twice as many input modules than said first data switch.

94. A combination according to claim 93, wherein said second data switch further has twice as many intermediate stage modules as said first switch.

95. A combination according to claim 94, wherein each of the data paths interconnecting an input stage module with an intermediate stage module has half the data rate in said second data switch than in said first data switch.

96. A combination according to claim 94, further including a third data switch comprising:
- a plurality of input modules and a plurality of output modules;
- a plurality of intermediate stage modules; and
- data paths interconnecting each of said input modules in said third data switch with each of said intermediate stage modules in said third data switch and each of said intermediate stage modules in said third data switch with each of said output modules in said third data switch, said input modules in said third data switch transmitting data segments toward said output modules in said third data switch via said intermediate stage modules in said third data switch,
- wherein all of the input modules in both said second and third data switches are identical in the logic they contain,
- wherein all of the intermediate stage modules in both said second and third data switches are identical in the logic they contain,
- wherein said third data switch has twice as many input modules as said second data switch and twice as many intermediate stage modules as said second switch,
- and wherein each of the data paths interconnecting an input stage module with an intermediate stage module has half the data rate in said third data switch as in said second data switch.

97. Apparatus according to claim 89, wherein each input module is disposed on a single integrated circuit chip with a respective one of the output modules in the same data switch.

98. A method comprising the steps of:
- providing a plurality of input modules and a plurality of output modules for each of first and second data switches connected either in series or in parallel in a data network;
- providing a plurality of intermediate stage modules for each of first and second data switches, each intermediate stage module provided for each subject one of said data switches including a multicast replicator for forwarding a data segment received from an input module provided for said subject data switch to more than one of the output modules provided for said subject data switch;
- each of first and second data switches having data paths interconnecting each of the input modules with each of the intermediate stage modules in the same data switch and each of the intermediate stage modules with each of the output modules in the same data switch, the input modules transmitting data segments toward the output modules in the same data switch via the intermediate stage modules in the same data switch; and providing a striping mechanism for each given one of said data switches, distributed across all of the input modules provided for the given data switch, which determines, for each data segment transmitted from an input module in the given data switch, a respective one of said intermediate stage modules in the given data switch via which the data segment should be transmitted, wherein all of the input modules provided for both said first and second data switches are identical in the logic they contain, and wherein the number of input modules provided for said second data switch differs from the number of input modules provided for said first data switch.

99. A method according to claim 98, wherein all of the intermediate stage modules provided for both said first and second data switches are identical in the logic they contain, and wherein the number of intermediate stage modules provided for said second data switch differs from the number of intermediate stage modules provided for said first data switch.

100. A method according to claim 98, wherein all of modules provided for both said first and second data switches are identical in the logic they contain.

101. A method according to claim 98, wherein both said first and second data switches are non-blocking.

102. A method according to claim 98, wherein the number of input modules provided for said second data switch is twice as large as the number of input modules provided for said first data switch.

103. A method according to claim 102, wherein the number of intermediate stage modules provided for said second data switch is twice as large as the number of intermediate stage modules provided for said first switch.

104. A method according to claim 103, wherein each of the data paths interconnecting an input stage module with an intermediate stage module has half the data rate in said second data switch than in said first data switch.

105. A method according to claim 103, further comprising the step of:

providing for a third data switch a plurality of input modules and a plurality of output modules;

providing for said third data switch a plurality of intermediate stage modules, said third data switch having data paths interconnecting each of the input modules in said third data switch with each of the intermediate stage modules in said third data switch and each of the intermediate stage modules in said third data switch with each of the output modules in said third data switch, said input modules in said third data switch transmitting data segments toward said output modules in said third data switch via said intermediate stage modules in said third data switch, wherein all of the input modules provided for both said second and third data switches are identical in the logic they contain, wherein all of the intermediate stage modules provided for both said second and third data switches are identical in the logic they contain, wherein the number of input modules provided for said third data switch is twice as large as the number of input modules provided for said second data switch, wherein the number of intermediate stage modules provided for said third data switch is twice as large as the number of intermediate stage modules provided for said second switch, and wherein each of the data paths interconnecting an input stage module with an intermediate stage module has half the data rate in said third data switch as in said second data switch.

106. Switching apparatus comprising:

a plurality of input modules and a plurality of output modules;

a plurality of intermediate stage modules, each intermediate stage module including a multicast replicator for forwarding a data segment received from an input module to more than one of said output modules;

data paths interconnecting each of said input modules with each of said intermediate stage modules and each of said intermediate stage modules with each of said output modules, said input modules transmitting data segments toward said output modules via said intermediate stage modules; and a striping mechanism which determines, for each subject one of said data segments, a respective one of said intermediate stage modules via which the subject data segment should be transmitted, wherein:

said striping mechanism is distributed across all of said input modules;

said striping mechanism comprises a path select mechanism in each of said input modules, the path select mechanism in each given one of said input modules comprising:

a mechanism for maintaining a measure of relative channel loading of routes from said each given input module to output modules, due to data that originated from said each given input module during a given prior time period, said measure of relative channel loading reflecting relative channel loading of each of the routes taken by multicast data segments originating from said each given input module; and a path select mechanism which, in dependence upon said measure of relative channel loading, determines a given one of said intermediate stage modules through which to send at least a subset of next data segments to be sent by said each given input module.

* * * * *